(12) United States Patent
Drayton et al.

(10) Patent No.: US 12,535,635 B2
(45) Date of Patent: Jan. 27, 2026

(54) THIN FILM LAYERS HAVING NON-UNIFORM THICKNESSES

(71) Applicant: Snap Inc., Santa Monica, CA (US)

(72) Inventors: Alexander Drayton, Abingdon (GB); Marcell Kiss, Didcot (GB); Parashara Panduranga, Banbury (GB); Jamie Dean Reynolds, Abingdon (GB); Cheng Shi, Didcot (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/532,594

(22) Filed: Dec. 7, 2023

(65) Prior Publication Data

US 2024/0192431 A1   Jun. 13, 2024

Related U.S. Application Data

(60) Provisional application No. 63/386,704, filed on Dec. 9, 2022.

(51) Int. Cl.
*F21V 8/00* (2006.01)
*G02B 27/01* (2006.01)

(52) U.S. Cl.
CPC .......... *G02B 6/005* (2013.01); *G02B 27/0172* (2013.01)

(58) Field of Classification Search
CPC .. G02B 6/005; G02B 27/0172; G02B 6/0036; G02B 5/1857; G02B 6/0065
USPC ....................................... 264/1.24
See application file for complete search history.

(56) References Cited

U.S. PATENT DOCUMENTS

| 2015/0003106 A1 | 1/2015 | Thompson et al. |
| 2022/0050241 A1 | 2/2022 | Colak et al. |

FOREIGN PATENT DOCUMENTS

| CN | 113811803 | | 12/2021 |
| CN | 120322710 | A | 7/2025 |
| EP | 3933259 | | 1/2022 |
| EP | 4202547 | | 6/2023 |
| GB | 2393267 | | 3/2004 |
| WO | 2024124040 | | 6/2024 |

OTHER PUBLICATIONS

"International Application Serial No. PCT/US2023/082957, International Search Report mailed Apr. 12, 2024", 4 pgs.
"International Application Serial No. PCT/US2023/082957, Written Opinion mailed Apr. 12, 2024", 6 pgs.
"International Application Serial No. PCT/US2023/082957, International Preliminary Report on Patentability mailed Jun. 19, 2025", 8 pgs.

*Primary Examiner* — Hannah J Pak
(74) *Attorney, Agent, or Firm* — Schwegman Lundberg & Woessner, P.A.

(57) ABSTRACT

In a thin film stack deposited on a substrate, a first layer can have a non-uniform thickness. A second layer, disposed so that the first layer is between the substrate and the second layer, can have a non-uniform thickness. A first pattern can be formed on the second layer to define first areas. The second layer can be etched in the first areas to form first holes having varying depths. A second pattern can be formed on the first layer in the first holes to define second areas. Each second area can be smaller than a corresponding first area. The first layer can be etched in the second areas to form second holes having varying depths. An imprint of the etched thin film stack can be formed such that the first holes and the second holes form a plurality of diffractive elements having varying sizes on the imprint.

20 Claims, 23 Drawing Sheets

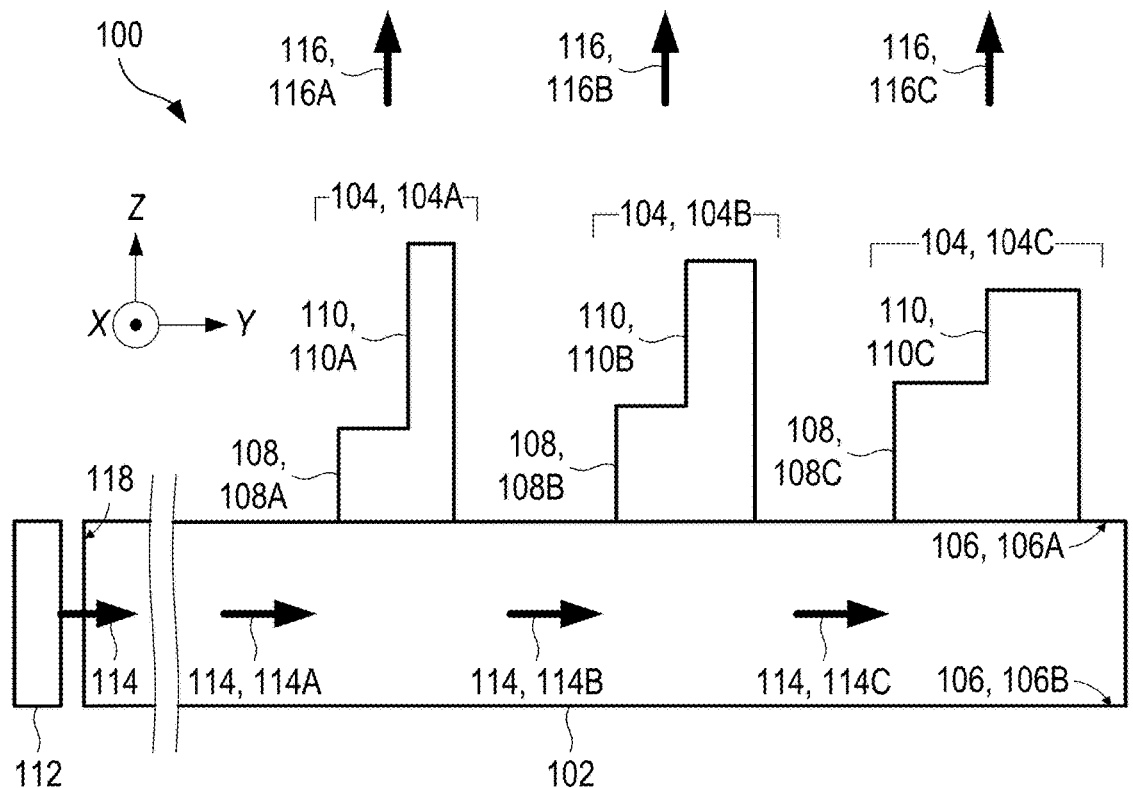
FIG. 1
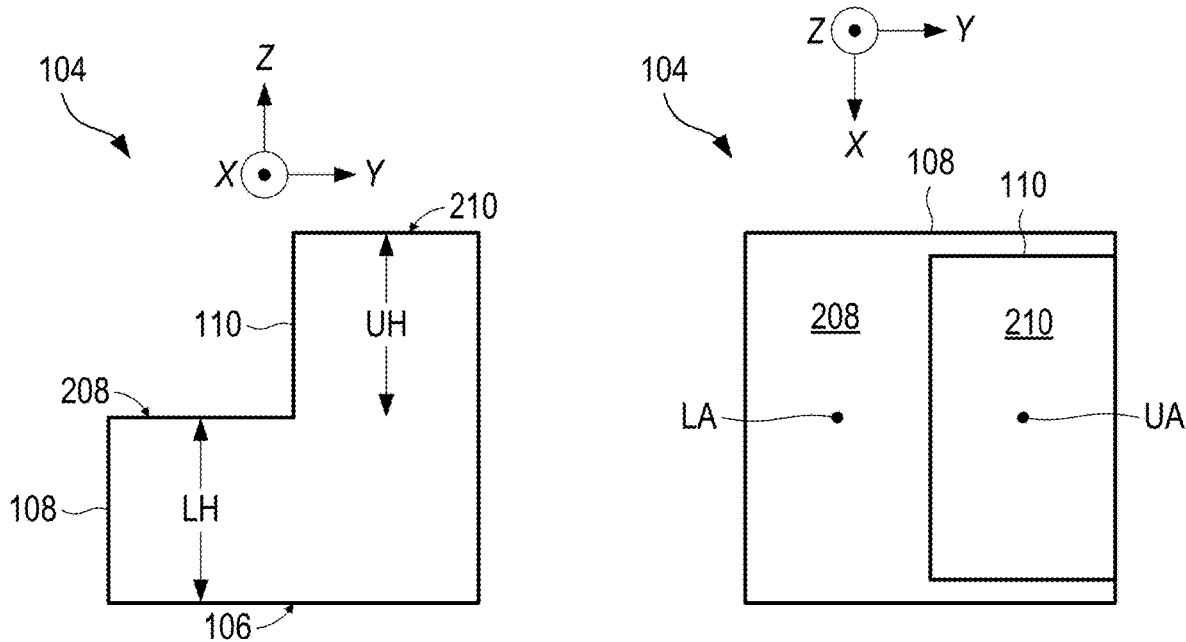
FIG. 2
FIG. 3

400

402

THIN FILM LAYERS HAVING NON-UNIFORM THICKNESSES

CROSS-REFERENCE TO RELATED APPLICATION

This application claims the benefit of U.S. Provisional Application No. 63/386,704, filed Dec. 9, 2022, which is hereby incorporated by reference in its entirety.

FIELD OF THE DISCLOSURE

The present disclosure relates to diffractive elements positioned over an area of a light-guiding surface of a light guide, and techniques for manufacturing such diffractive elements.

BACKGROUND OF THE DISCLOSURE

An augmented reality headset may include at least one display that can display additional content to the user, which can appear to the user as being superimposed on real-world objects proximate the user. There is ongoing effort to improve augmented reality headsets.

BRIEF DESCRIPTION OF THE DRAWINGS

FIG. 1 shows a side view of an example of an illumination system.

FIG. 2 shows a side-view drawing of an example of a diffractive element.

FIG. 3 shows a top-view drawing of the diffractive element of FIG. 2.

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 4:
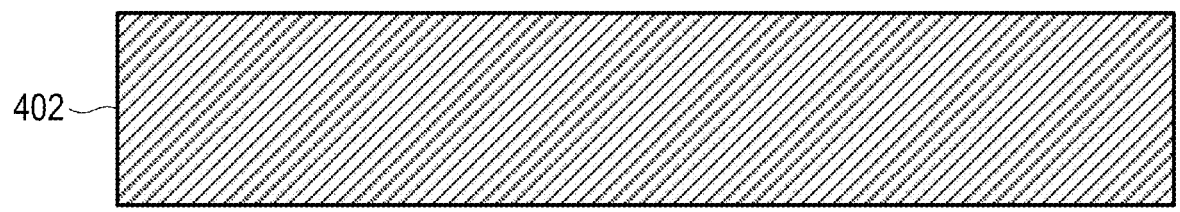
FIG. 4 shows a side-view cross-section of an illumination system after a first stage of assembly.

An augmented reality headset can include two displays. Each display can be located proximate a respective eye of a user. The displays can be worn, such as in the form of spectacles or a headset. Each display can be at least partially transparent, such that the user can observe real-world objects proximate the user through each display. Each display can display additional content to the user, which can appear to the user as being superimposed on the real-world objects proximate the user.

In an example of augmented reality display, a light source can direct light into a light guide. The light guide can extend over a surface area of the display. The light guide can guide light as guided light from the light source to all, most, or at least some of the surface area of the light guide. Diffractive elements, distributed over the surface area of the light guide, can extract at least some of the guided light from the light guide and direct the extracted light toward an eye of the user. The light extracted from the light guide by the diffractive elements provides additional content to the user. Because the diffractive elements may occupy a relatively small fraction of the surface area of the light guide, the remaining surface area of the light guide can be at least partially transparent, which can allow the user to view the surrounding real-world objects through the light guide.

To help avoid having differences in brightness over the surface area of the display, such as a portion of the display relatively close to the light source being brighter than another portion of the display that is relatively far from the light source, the diffractive elements can vary in size and/or shape over the surface area of the light guide. For example, a diffractive element that is relatively close to the light source may be shaped and sized to have a relatively low diffraction efficiency (e.g., a value between zero and one representing a fraction of incident light that is coupled into a specified diffractive order), while a diffractive element that is relatively far from the light source may be shaped and sized to have a relatively high diffraction efficiency.

FIGS. 1-3 show an example of an illumination system, including diffractive elements that can vary in at least one of size and shape. FIGS. 4-15 show an example of a manufacturing technique that can produce the illumination system, including the diffractive elements that can vary in at least one of size and shape. FIGS. 16-23 show another example of a manufacturing technique that can produce the illumination system, including the diffractive elements that can vary in at least one of size and shape. Both manufacturing techniques make use of thin-film stacks that include one or more layers having a non-uniform thickness.

For example, in a thin film stack deposited on a substrate, a first layer can have a non-uniform thickness. A second layer, disposed so that the first layer is between the substrate and the second layer, can have a non-uniform thickness. A first pattern can be formed on the second layer to define first areas. The second layer can be etched in the first areas to form first holes having varying depths. A second pattern can be formed on the first layer in the first holes to define second areas. Each second area can be smaller than a corresponding first area. The first layer can be etched in the second areas to form second holes having varying depths. An imprint of the etched thin film stack can be formed such that the first holes and the second holes form a plurality of diffractive elements having varying sizes on the imprint.

FIG. 1 shows a side view of an example of an illumination system 100. The illumination system 100 can utilize diffractive elements having non-uniform properties, such as at least one of size and shape, over or within a specified surface area thereof. The non-uniform properties can at least partially compensate for non-uniformities in brightness that can arise as a function of distance away from a light source.

The illumination system 100 can include a light guide 102. The light guide 102 may be referred to as a waveguide. For the purposes of this document, the terms light guide and waveguide are used interchangeably. The light guide 102 can be configured as a planar light guide, with light guiding surfaces 106, such as a light-guiding surface 106A and an opposing light-guiding surface 106B. During operation of the illumination system 100, the light guide 102 can guide guided light via total internal reflection from the light-guiding surface 106A and the light-guiding surface 106B. In some examples, the light guide 102 can be planar, such that the light guiding surfaces 106 are planar and parallel. In other examples, the light guide 102 can be curved with a relatively large radius of curvature. For example, the light guide 102 can optionally be shaped in the form of a spectacle lens, which has opposing light guiding surfaces 106 that are both curved outward from a user's eye to avoid contact with the user's eyelashes. The light guide 102 can be formed from a material that is transparent or at least partially transparent for wavelengths in the visible portion of the electromagnetic spectrum, such as between about 400 nm and about 700 nm. Suitable materials for the light guide 102 include glass, fused silica, an optical plastic such as polycarbonate, and others.

The illumination system 100 can include a plurality of diffractive elements 104 positioned over or within an area of a light-guiding surface 106 of the light guide 102. In the configuration of FIG. 1, the diffractive elements 104 are positioned over an area of the light-guiding surface 106A. Alternatively, the diffractive elements 104 can be positioned over an area of the light-guiding surface 106B. Each diffractive element 104 includes a lower element 108 extending from the light-guiding surface 106 and an upper element 110 extending from the lower element 108. FIG. 1 shows the illumination system 100 as including three diffractive elements 104A, 104B, and 104C. In practice, an actual illumination system 100 can include significantly more than three diffractive elements, such as hundreds or thousands of diffractive elements 104.

The illumination system 100 can include a light source 112 disposed at a first edge 118 of the light-guiding surfaces 106 of the light guide 102. Suitable light sources can include light emitting diodes, such as white light emitting diodes or single-wavelength light emitting diodes, such as red light emitting diodes, green light emitting diodes, and blue light emitting diodes, laser diodes, or other suitable light sources. The light source 112 directs light 114 into the light guide 102. The light guide 102 is configured to guide light 114 from the light source as guided light. The light source 112 may be referred to as a projector or light engine, which may include a reflective, transmissive, or emissive display panel, such as a liquid crystal on silicon (LCoS) or microLED display. The light source 112 may also include optics, such as one or more lenses, to focus an image from the display panel as a pupil onto an input grating of the light guide 102.

The diffractive elements 104 extract guided light 114 out of the light guide 102 as extracted light 116. The diffractive elements 104 can vary in at least one of size and shape. As the light 114 propagates away from the light source 112, such as with increasing distance along the Y-axis away from the first edge 118 of the light-guiding surfaces 106, the amount of light 114 within the light guide 102 decreases. The "amount" of guided light 114 corresponds to the energy of the guided light in the light guide 102, with the amount of energy decreasing as diffractive elements 104 extract guided light 114 out of the light guide 102 as the guided light 114 propagates away from the light source 112. For example, near the light source 112, the first amount of light 114A can be relatively high. A first diffractive element 104A extracts some light 116, such as extracted portion of light 116A, out of the light guide 102, such that a second amount of light 114B is less than the first amount of light 114A. A second diffractive element 104B also extracts some light 116, such as extracted portion of light 116B, out of the light guide 102, such that a third amount of light 114C is less than the second amount of light 114B. A third diffractive element 104C also extracts some light 116, such as extracted portion of light 116C, out of the light guide 102, and so forth.

It should be noted that in practice, the diffractive elements 104 may not individually extract light from the light guide 102 to produce the extracted light 116, but may act in concert with adjacent diffractive elements 104 to produce the extracted light 116. For example, the diffractive elements 104 can be spaced with a spacing that allows the light 114 to be directed into extracted light 116 having a specified propagation direction or a specified range of propagation directions. The diffractive elements 104 can have a size and shape that vary over a surface area of the light-guiding surface 106 of the light guide 102. The size and shape of the diffractive elements 104 can determine, at least in part, how much of the light 114 is extracted to form the extracted light 116, as a function of location across the light-guiding surface 106 of the light guide 102.

FIG. 2 shows a side-view drawing of an example of a diffractive element 104. FIG. 3 shows a top-view drawing of the diffractive element 104 of FIG. 2. In some examples, the lower element 108 and the upper element 110 of each diffractive element 104 are substantially orthogonal to the light-guiding surface 106 of the light guide 102.

The lower element 108 can have a lower height (LH) in a direction orthogonal to the light-guiding surface 106 of the light guide 102. The lower element 108 can have a lower cross-sectional area (LA), such as on a surface 208, in a plane parallel to the light-guiding surface 106 of the light guide 102. The upper element 110 can have an upper height (UH) in the direction orthogonal to the light-guiding surface 106 of the light guide 102. The upper element 110 can have an upper cross-sectional area (UA), such as on a surface 210, in the plane parallel to the light-guiding surface 106 of the light guide 102. The upper cross-sectional area (UA) can be less than the lower cross-sectional area (LA).

The lower heights (LH) and the upper heights (UH) of the plurality of diffractive elements 104 can vary over the area of the light-guiding surface 106 of the light guide 102. For example, in the example of FIG. 1, the lower height (LH) of a first lower element 108A of the first diffractive element 104A is less than a lower height of a second lower element 108B of the second diffractive element 104B, which in turn can be less than a lower height of a third lower element 108C of the third diffractive element 104C. Likewise, in the example of FIG. 1, the upper height of a first upper element 110A of the first diffractive element 104A can be greater than an upper height of a second upper element 110B of the second diffractive element 104B, which in turn can be greater than an upper height of a third upper element 110C of the third diffractive element 104C. The configuration of FIG. 1 is but one example of how the sizes and shapes of the diffractive elements 104 can vary over a surface area of a light-guiding surface 106 of the light guide 102. Other configurations can also be used.

In some examples, the diffractive elements 104 can have lower heights (LH), lower cross-sectional areas (LA), upper heights (UH), and upper cross-sectional areas (UA) selected such that the extracted light portions, such as light 116, have values of optical power per area that are substantially equal or tunable in a way that is beneficial for the optical design, such as by making a background appear more uniform or making an image appear more accurate.

In some examples, the lower heights (LH) of the diffractive elements 104 can vary monotonically as a function of distance away from the first edge 118 of the light-guiding surface 106 of the light guide 102. For example, the lower heights (LH) can increase or remain constant as a function of distance away from the first edge 118 of the light-guiding surface 106 of the light guide 102. As another example, the lower heights (LH) can decrease or remain constant as a function of distance away from the first edge 118 of the light-guiding surface 106 of the light guide 102.

In some examples, the upper heights (UH) of the diffractive elements 104 can vary monotonically as a function of distance away from the first edge 118 of the light-guiding surface 106 of the light guide 102. For example, the upper heights (UH) can increase or remain constant as a function of distance away from the first edge 118 of the light-guiding surface 106 of the light guide 102. As another example, the upper heights (UH) can decrease or remain constant as a function of distance away from the first edge 118 of the light-guiding surface 106 of the light guide 102.

FIGS. 4-15 show an example of a manufacturing technique that can produce the illumination system, such as illumination system 100 of FIG. 1, including the diffractive elements 104 that can vary in at least one of size and/or shape over a surface area of a light guide. The technique of FIGS. 4-15 can produce other illumination systems as well. The technique of FIGS. 4-15 is but one manufacturing technique to produce the illumination system 100 of FIG. 1. Other manufacturing techniques can also be used.

FIG. 4 shows a side-view cross-section of an illumination system 400 after a first stage of assembly. In FIG. 4, a substrate 402 is provided. In some examples, the substrate 402 can include a layer of base material, such as silicon, quartz, glass, or another suitable material. In some examples, the base layer can have a thickness between about 0.1 mm and about 10 mm. In some examples, the base layer can be a wafer having a diameter of 100 mm, 150 mm, 200 mm, 300 mm, 400 mm, or another suitable value. During subsequent assembly stages, a thin film stack may be deposited on the substrate 402, as will be described in more detail below.

Figure 5:
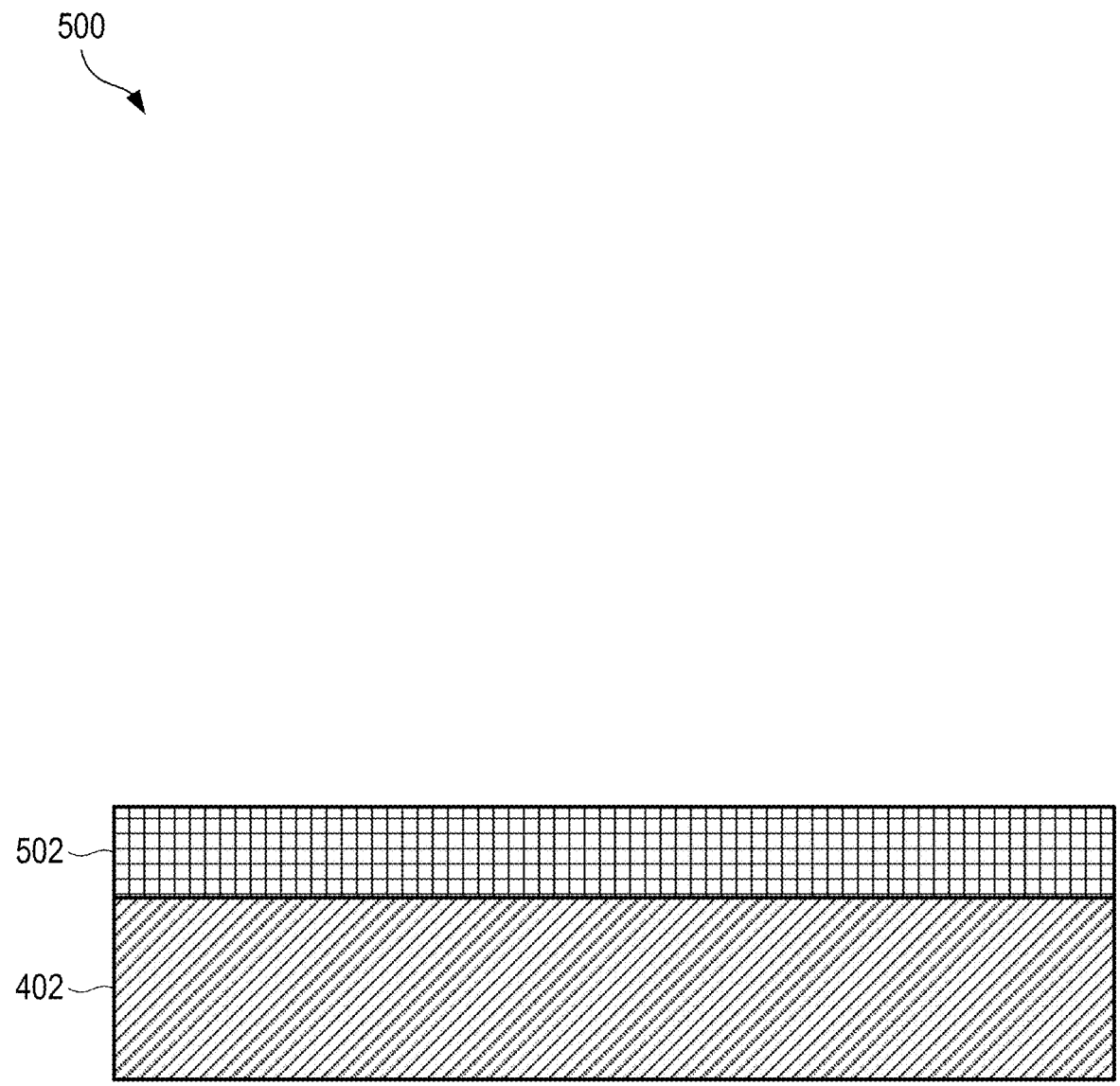
FIG. 5 shows a side-view cross-section of an illumination system after a second stage of assembly.

FIG. 5 shows a side-view cross-section of an illumination system 500 after a second stage of assembly. In FIG. 5, a first layer 502 has been deposited on the substrate 402. In some examples, the first layer 502 can function as an etch stop layer. In some examples, the first layer 502 can be formed from a material that is resistant to an etchant that may be used on subsequently deposited layers during the process of forming a desired pattern in or on the substrate 402. In some examples, the first layer 502 can include an etch stop material, such as silicon dioxide ($SiO_2$). The etch stop material can be significantly less susceptible to etchant compared with etchable layers, such as layer 602 and 802, as discussed in more detail below. In some examples, the first layer 502 can resist being etched longer than the etchable layers by a factor of at least ten, at least twenty, at least thirty times, at least 40, at least 50, at least 100, or another suitable factor. Such resistance to etching can improve dimensional control of the diffractive elements 104 prepared using a thin film stack as disclosed herein according to embodiments of the present disclosure.

In some examples, the first layer 502 can have a uniform thickness. In some examples, the first layer 502 can be applied by sputter coating, vapor phase deposition, or another suitable coating process. In some examples, the first layer 502 can have a thickness between about 5 nm and about 50 nm, at least 10 nm, at least 20 nm, at least 30 nm, at least 40 nm, at least 50 nm, or another suitable thickness value.

Figure 6:
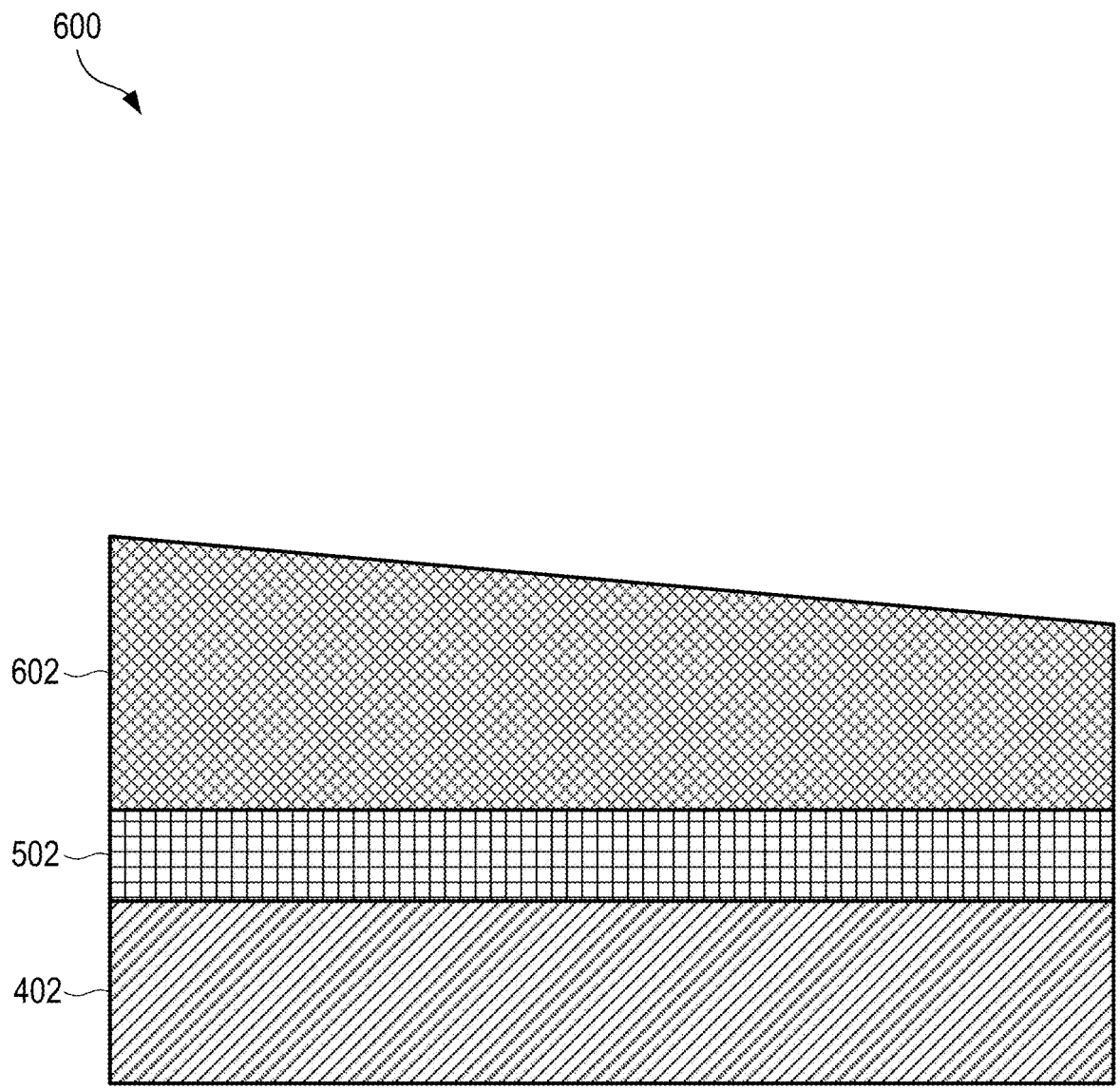
FIG. 6 shows a side-view cross-section of an illumination system after a third stage of assembly.

FIG. 6 shows a side-view cross-section of an illumination system 600 after a third stage of assembly. In FIG. 6, a second layer 602 has been deposited on the first layer 502. In some examples, the second layer 602 can be deposited via graded sputtering or another suitable technique, such that the second layer 602 can have a non-uniform thickness. In some examples, the second layer 602 can be an etchtable or etch layer. In some examples, the second layer 602 is formed from a material that is susceptible to etchant (i.e., is etchable). In some examples, the second layer 602 can be formed from amorphous silicon (Si), or another suitable material.

In some examples, the second layer 602 can have a thickness that is greater than 25 nm, greater than 30 nm, greater than 35 nm, greater than 40 nm, greater than 45 nm, greater than 50 nm, greater than 55 nm, greater than 60 nm, greater than 65 nm, greater than 70 nm, greater than 75 nm, or has another suitable value of thickness. In some examples, the second layer 602 can have a thickness that varies between about 10 nm and about 1000 nm across a width of the substrate 402 (in the X-Y plane of FIGS. 1-3).

In some examples, the second layer 602 can have a thickness profile having a linear gradient in a ratio of about 10:1 across a width of the substrate 402. In some examples, the second layer 602 can have a first region over which the layer thickness is a constant first value and a second region over which the layer thickness varies from the first value to a second value. In some examples, the second layer 602 can have a thickness profile having a constant thickness of about 65 nm for about 20% of a width of the substrate 402, with a linear taper from about 65 nm to about 25 nm for about 80% of the width of the substrate 402. In some examples, the second layer 602 can have a thickness profile having a constant thickness of about 50 nm for about 15% of a width of the substrate 402, a constant thickness of about 65 nm thickness for about 5% of the width of the substrate 402, a linear taper from about 65 nm to about 25 nm for about 80% of the width of the substrate 402. In some examples, the second layer 602 can have a thickness profile having an inverse square decay from about 65 nm to about 25 nm across a width of the substrate 402. In some examples, the second layer 602 can have a thickness profile having an exponential decay from about 65 nm to about 25 nm across a width of the substrate 402. Other thickness profiles can also be used.

Figure 7:
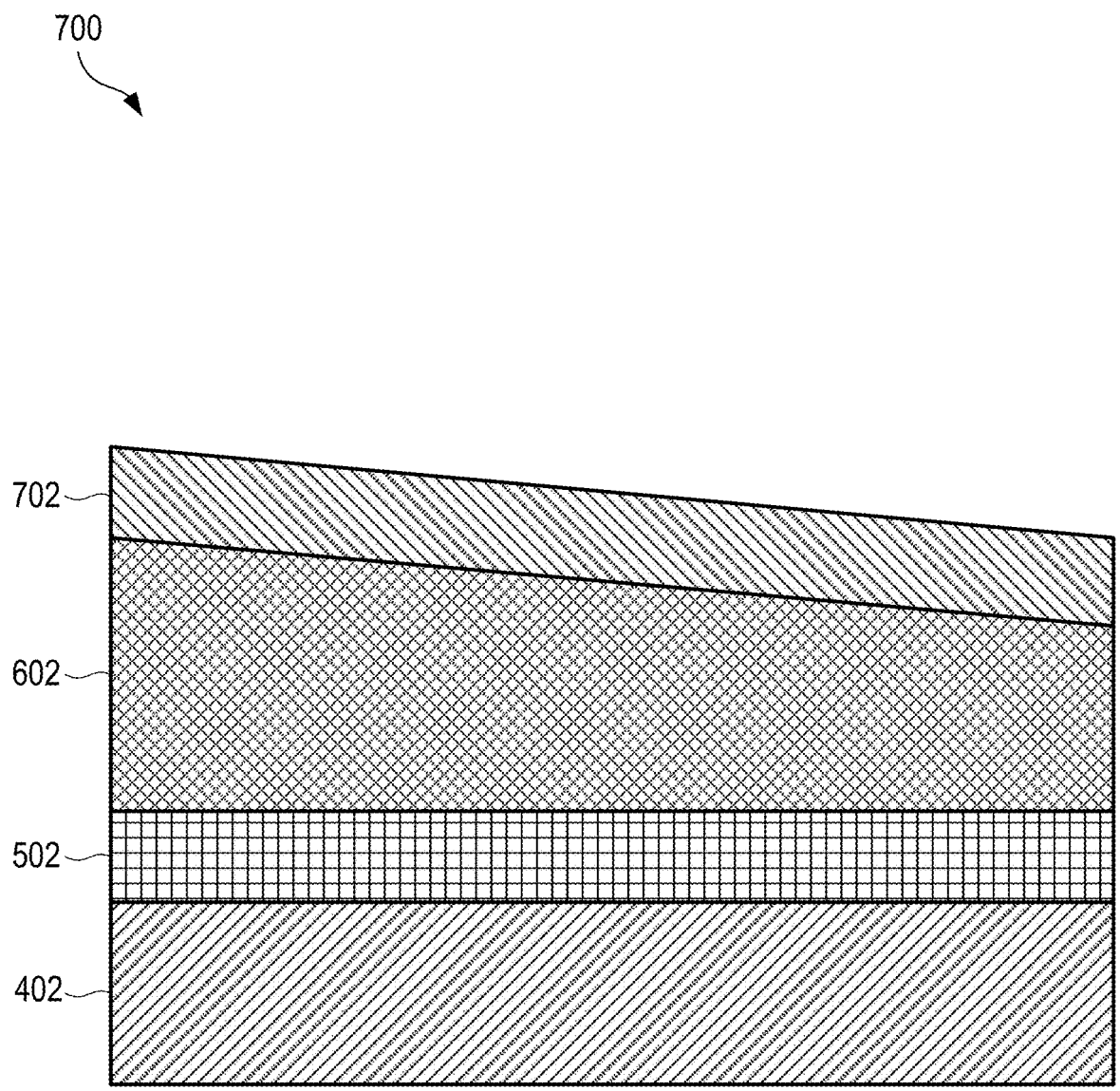
FIG. 7 shows a side-view cross-section of an illumination system after a fourth stage of assembly.

FIG. 7 shows a side-view cross-section of an illumination system 700 after a fourth stage of assembly. In FIG. 7, a third layer 702 has been deposited on the second layer 602. In some examples, the third layer 702 can function as an etch stop layer. In some examples, the third layer 702 can be formed from a material that is resistant to an etchant that may be used on subsequently deposited layers during the process of forming a desired pattern in or on the substrate 402. In some examples, the third layer 702 can include an etch stop material, such as silicon dioxide ($SiO_2$). In some examples, the third layer 702 can have a uniform thickness. In some examples, the third layer 702 can be applied by sputter coating, vapor phase deposition, or another suitable coating process. In some examples, the third layer 702 can have a thickness between about 5 nm and about 50 nm, at least 10 nm, at least 20 nm, at least 30 nm, at least 40 nm, at least 50 nm, or another suitable thickness value.

Figure 8:
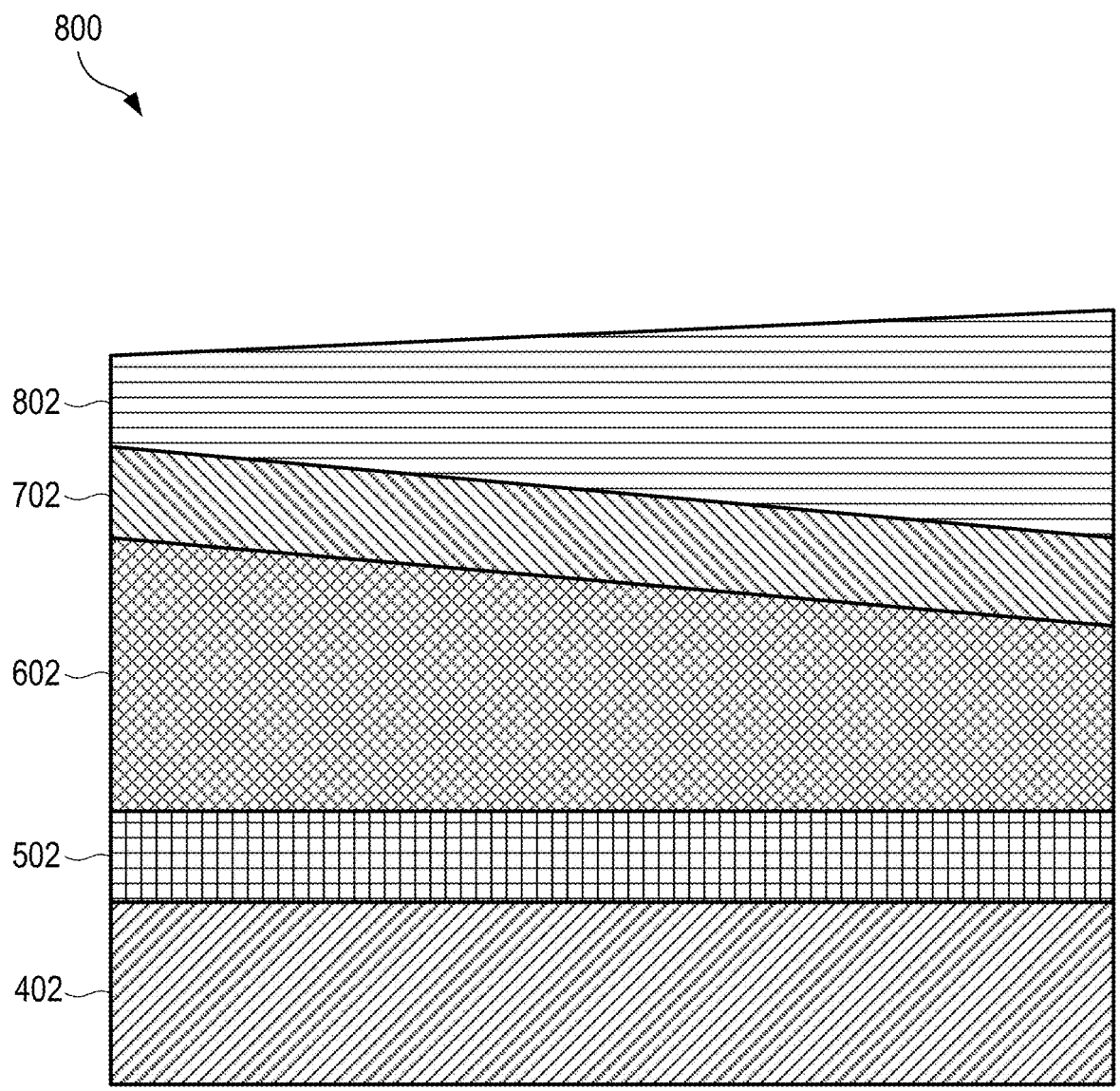
FIG. 8 shows a side-view cross-section of an illumination system after a fifth stage of assembly.

FIG. 8 shows a side-view cross-section of an illumination system 800 after a fifth stage of assembly. In FIG. 8, a fourth layer 802 has been deposited on the third layer 702. In some examples, the fourth layer 802 can be deposited via graded sputtering or another suitable technique, such that the fourth layer 802 can have a non-uniform thickness. In some examples, the fourth layer 802 can be an etch layer. In some examples, the fourth layer 802 can be formed from a material that is susceptible to etchant (e.g., is etchable). In some examples, the fourth layer 802 can be formed from amorphous silicon (Si), or another suitable material.

In some examples, the fourth layer 802 can have a thickness that is greater than 25 nm, greater than 30 nm, greater than 35 nm, greater than 40 nm, greater than 45 nm, greater than 50 nm, greater than 55 nm, greater than 60 nm, greater than 65 nm, greater than 70 nm, greater than 75 nm, or has another suitable value of thickness. In some examples, the fourth layer 802 can have a thickness that varies between about 10 nm and about 1000 nm across a width of the substrate 402.

In some examples, the fourth layer 802 can have a thickness profile having a linear gradient in a ratio of about 10:1 across a width of the substrate 402. In some examples, the fourth layer 802 can have a first region over which the layer thickness is a constant first value and a second region over which the layer thickness varies from the first value to a second value. In some examples, the fourth layer 802 can have a thickness profile having a constant thickness of about 65 nm for about 20% of a width of the substrate 402, with a linear taper from about 65 nm to about 25 nm for about 80% of the width of the substrate 402. In some examples, the fourth layer 802 can have a thickness profile having a constant thickness of about 50 nm for about 15% of a width of the substrate 402, a constant thickness of about 65 nm thickness for about 5% of the width of the substrate 402, a linear taper from about 65 nm to about 25 nm for about 80% of the width of the substrate 402. In some examples, the fourth layer 802 can have a thickness profile having an inverse square decay from about 65 nm to about 25 nm across a width of the substrate 402. In some examples, the fourth layer 802 can have a thickness profile having an exponential decay from about 65 nm to about 25 nm across a width of the substrate 402. Other thickness profiles can also be used. In some examples, the thickness profile of the fourth layer 802 can differ from the thickness profile of the second layer 602.

Figure 9:
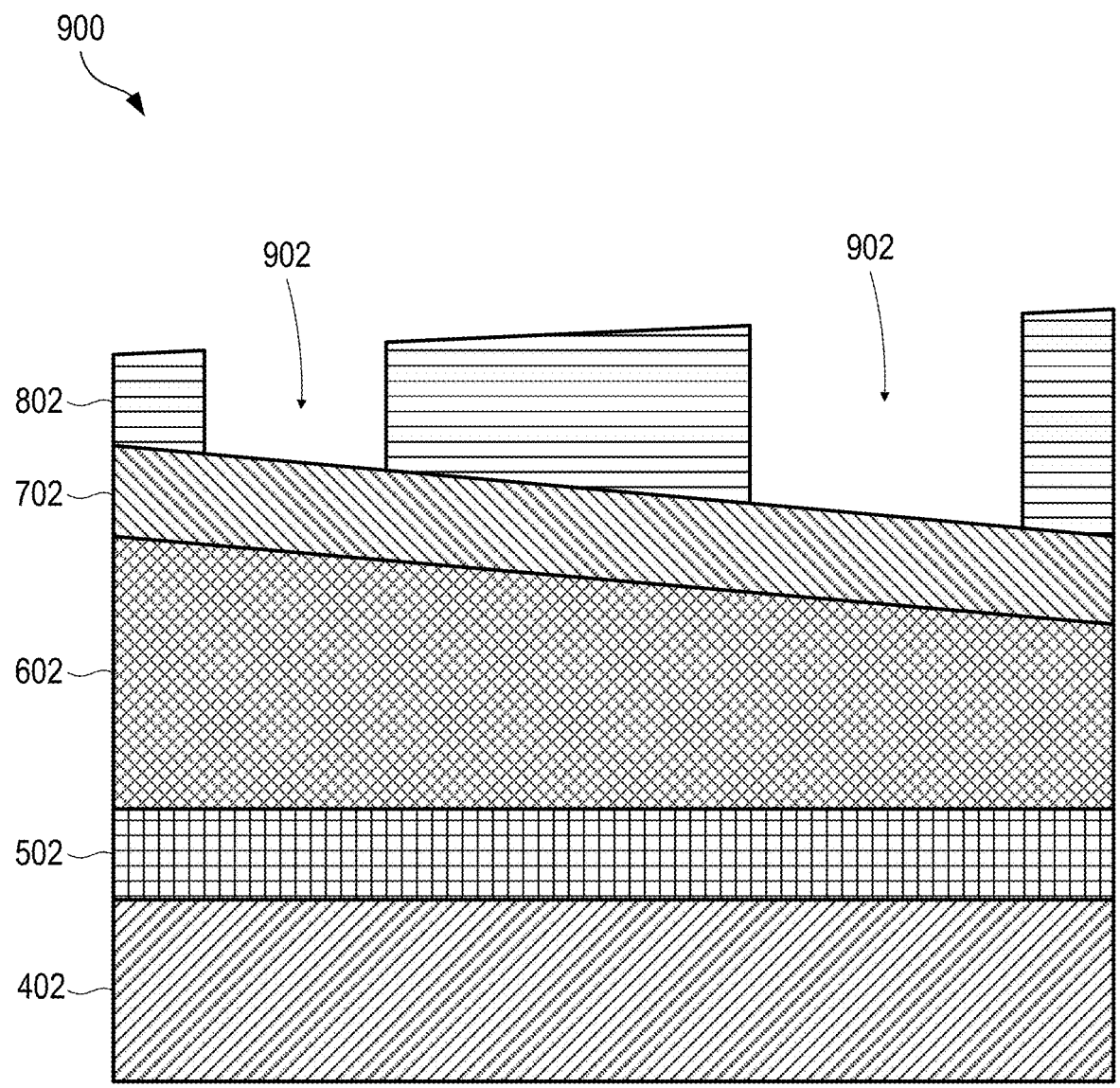
FIG. 9 shows a side-view cross-section of an illumination system after a sixth stage of assembly.

FIG. 9 shows a side-view cross-section of an illumination system 900 after a sixth stage of assembly. A first mask layer (not shown) has been applied over the fourth layer 802. Electron-beam lithography (or another suitable technique) has defined a first pattern in the first mask layer to define first areas. In some examples, the first areas correspond to areas of the first mask layers that have been removed. In other examples, the first areas correspond to areas of the first mask layer that remain after other areas of the first mask layer have been removed. The first areas can correspond to a combination of the lower cross-sectional area (LA), such as on the surface 208 (FIGS. 2 and 3) and the upper cross-sectional area (UA), such as on the surface 210 (FIGS. 2 and 3). In other words, the first areas can correspond to areas in the plane of the light-guiding surface 106 that include cross-sectional areas (LA), (UA) of both the upper elements 110 and the lower elements 108. Subsequent stages will define second areas within the first areas, to distinguish the upper elements 110 from the lower elements 108.

After the first areas have been defined, the fourth layer 802 can be exposed to a dry etching process, such as reactive ion etching (RIE), inductively coupled plasma etching (ICP), atomic layer etching (ALE), or deep reactive ion etching (DRIE). The etching can use an etchant such as a bromine-based plasma, a chlorine-based plasma, a fluorine-based plasma, such as sulfur hexafluoride ($SF_6$), or another suitable material. The plasma can etch the fourth layer 802 fully to the third layer 702. The third layer 702 can be resistant to etching by the etchant and can therefore function as an etch stop layer.

After the fourth layer 802 has been etched, such as through deep reactive ion etching, using sulfur hexafluoride ($SF_6$) as an etchant, the fourth layer 802 has first holes 902 in regions that correspond to the first areas.

Figure 10:
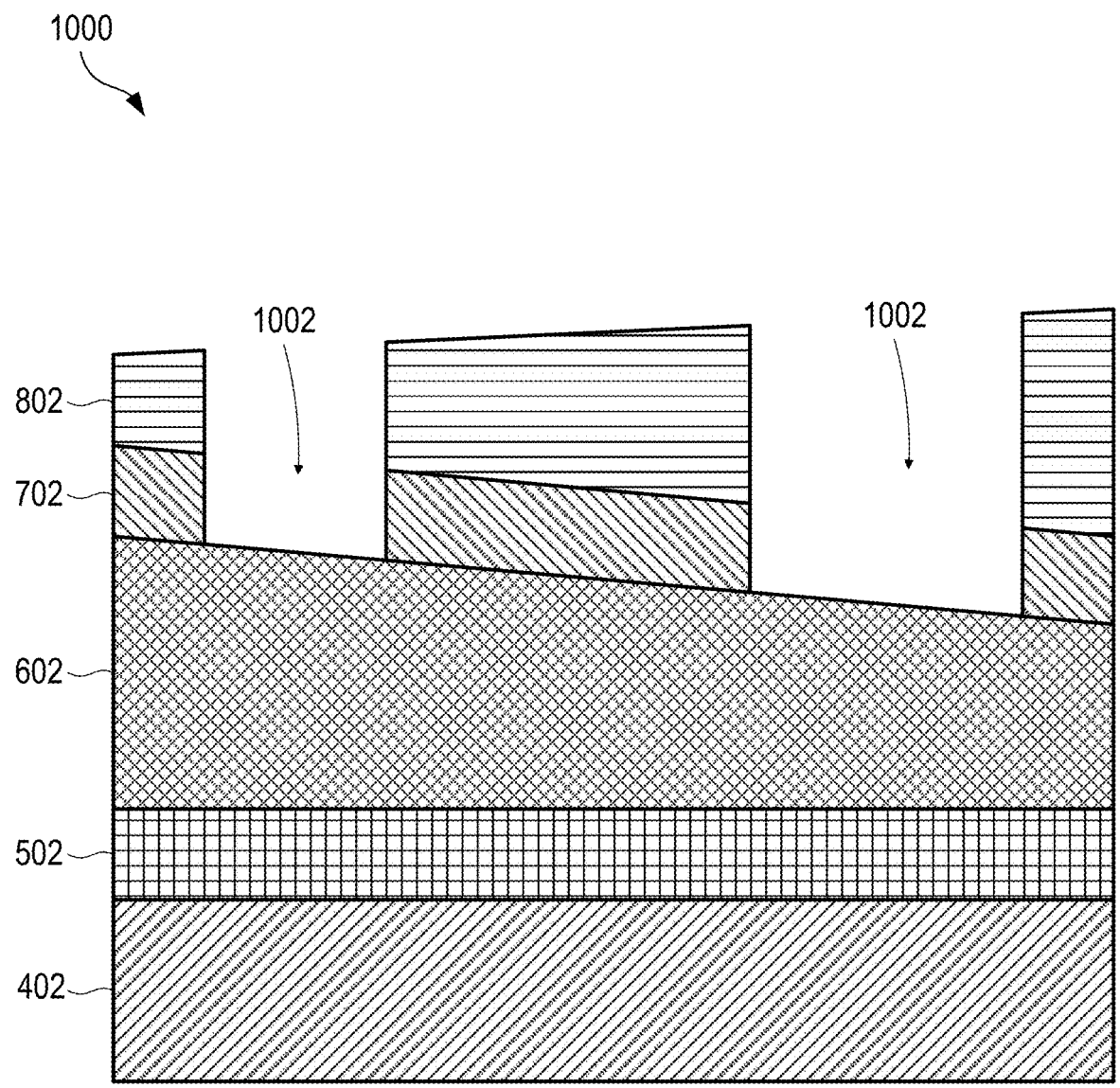
FIG. 10 shows a side-view cross-section of an illumination system after a seventh stage of assembly.

FIG. 10 shows a side-view cross-section of an illumination system 1000 after a seventh stage of assembly. In FIG. 10, the third layer 702 has been etched, such as with deep reactive ion etching, such as by using trifluoromethane ($CHF_3$). The etching has deepened the first holes 902 to form deepened first holes 1002. The etching can etch the holes fully through the third layer 702. The deepened first holes 1002 can have depths that correspond to the non-uniform thickness of the fourth layer 802 plus the uniform thickness of the third layer 702. The deepened first holes 1002 may also be referred to as simply first holes in the present description.

Figure 11:
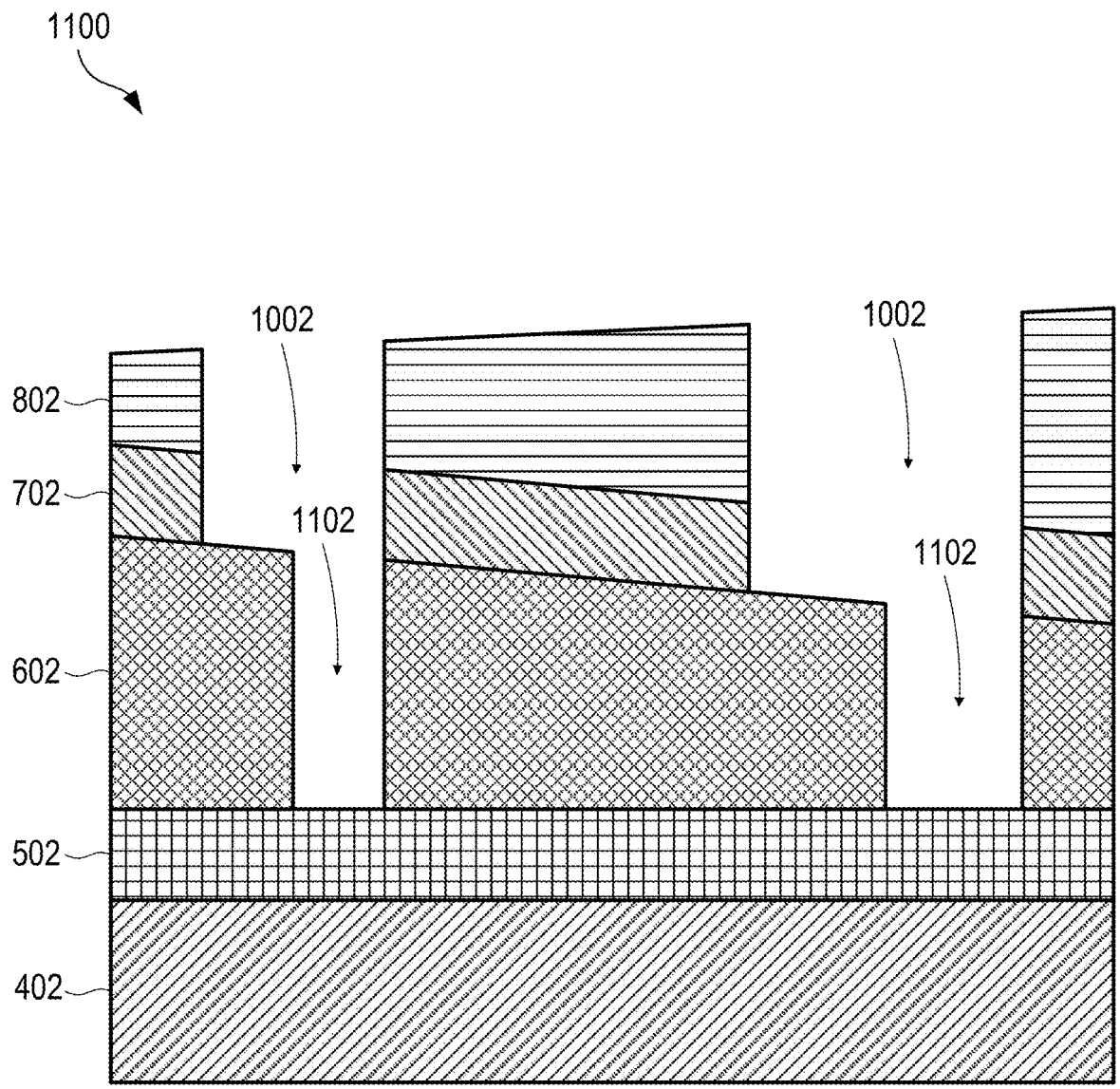
FIG. 11 shows a side-view cross-section of an illumination system after an eighth stage of assembly.

FIG. 11 shows a side-view cross-section of an illumination system 1100 after an eighth stage of assembly. A second mask layer (not shown) has been applied over the second layer 602 (and remaining fourth layer 802 as appropriate). Electron-beam lithography (or another suitable technique) has defined a second pattern in the second mask layer to define second areas within respective deepened first holes 1002. Each second area can be smaller than a corresponding first area.

In some examples, the second areas correspond to areas of the second mask layers that have been removed. In other examples, the second areas correspond to areas of the second mask layer that remain after other areas of the second mask layer have been removed. The second areas correspond to the upper cross-sectional area (UA) on the surface 210 (FIGS. 2 and 3) of the diffractive elements 104.

After the second areas have been defined, the second layer 602 can be exposed to a dry etching process, such as reactive ion etching (RIE), inductively coupled plasma etching (ICP), atomic layer etching (ALE), or deep reactive ion etching (DRIE). The etching can use an etchant such as a bromine-based plasma, a chlorine-based plasma, a fluorine-based plasma, such as sulfur hexafluoride ($SF_6$), or another suitable material. The plasma can etch the second layer 602 fully to the first layer 502. The first layer 502 can be resistant to etching by the etchant, and therefore functions as an etch stop layer.

After the second layer 602 has been etched, such as with deep reactive ion etching, such as by using sulfur hexafluoride ($SF_6$) as an etchant, the second layer 602 has second holes 1102 in regions that correspond to the second areas.

Figure 12:
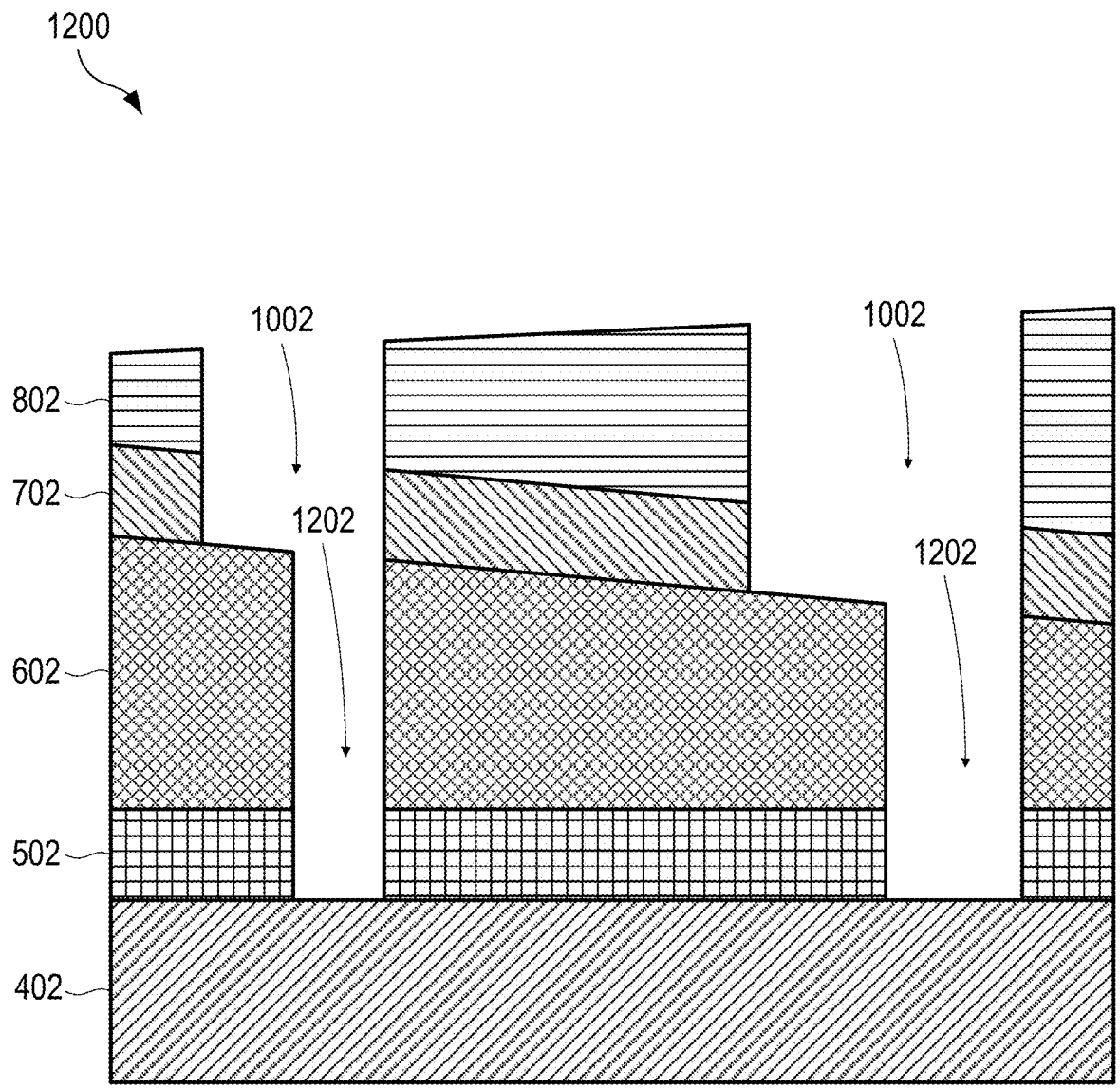
FIG. 12 shows a side-view cross-section of an illumination system after a ninth stage of assembly.

FIG. 12 shows a side-view cross-section of an illumination system 1200 after a ninth stage of assembly. In FIG. 12, the first layer 502 has been etched, such as with deep reactive ion etching, such as by using trifluoromethane ($CHF_3$). The etching deepens the second holes 1102 to form deepened second holes 1202. The etching can etch the holes fully through the first layer 502. The deepened second holes 1202 can have depths that correspond to the non-uniform thickness of the second layer 602 plus the uniform thickness of the first layer 502. The deepened second holes 1202 may be referred to as simply second holes in the present description. FIG. 12 illustrates an etched thin film stack, where the thin film stack is shown in FIG. 8 and corresponds to the substrate 402 and layers 502-802 formed on the substrate.

Figure 13:
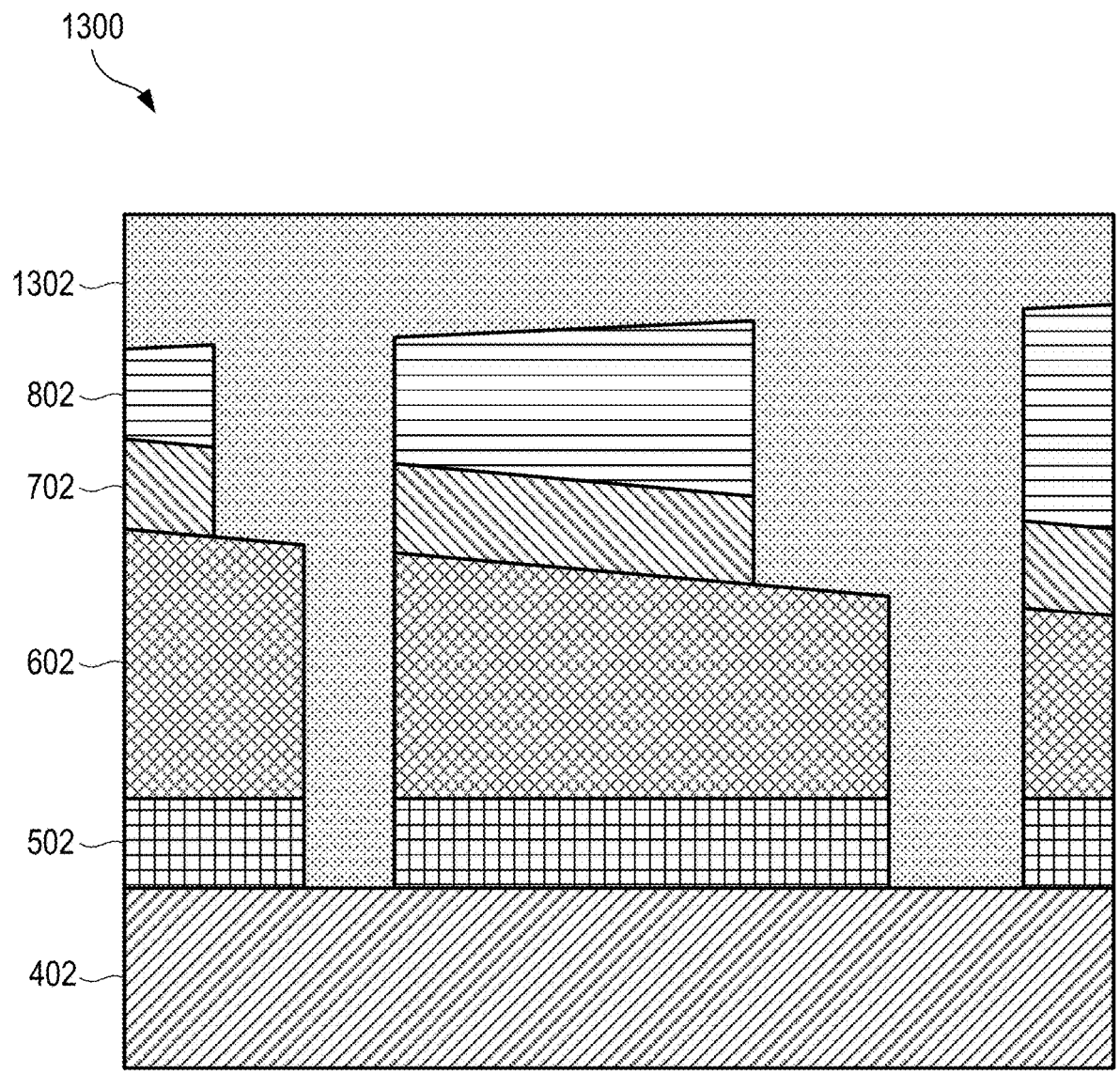
FIG. 13 shows a side-view cross-section of an illumination system after a tenth stage of assembly.

FIG. 13 shows a side-view cross-section of an illumination system 1300 after a tenth stage of assembly. A material layer 1302 has been deposited over the fourth layer 802 and has filled in the volumes of the first and second holes defined by the earlier etching, to form an imprint of the etched thin film stack. In the imprint, the material of the material layer 1302 in the deepened first holes 1002 and the deepened second holes 1202 will form a plurality of diffractive elements.

Figure 14:
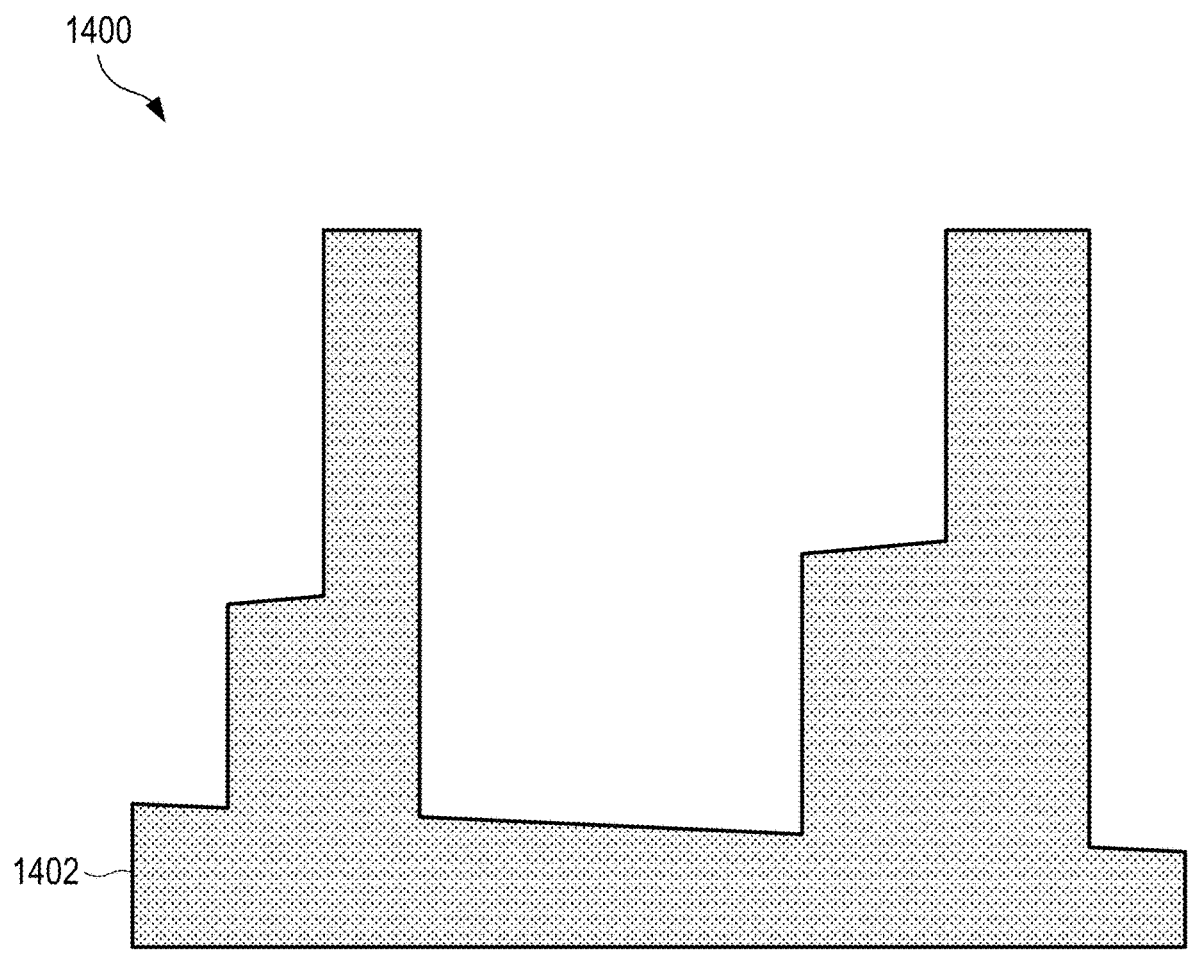
FIG. 14 shows a side-view cross-section of an illumination system after an eleventh stage of assembly.

FIG. 14 shows a side-view cross-section of an illumination system 1400 after an eleventh stage of assembly. The material layer 1302 has been separated from the thin film stack, which includes the substrate 402, the first layer 502, the second layer 602, the third layer 702, and the fourth layer 802, to form the imprint 1402. The imprint 1402 has been inverted top-to-bottom in FIG. 14, compared to the orientations shown in FIGS. 4-13.

Although FIG. 14 shows the horizontal surfaces of the imprint 1402 as being angled away from being truly horizontal (and therefore angled away from being parallel to a surface of the light guide 102 when the imprint 1402 is attached to the light guide 102, as shown below in FIG. 15), it should be noted that in practice, the angling may be extremely small. For example, for a layer that has a variation in thickness of 40 nm across a wafer having a diameter of 100 mm, the angling is $4 \times 10^{-7}$ radians, which is imperceptibly small. It will be understood that the angling away from horizontal in FIG. 14 is retained merely for clarity and consistency with earlier drawings and does not imply that the surfaces in FIG. 14 that are shown as being angled away from horizontal are angled in any perceptible manner in practice.

Figure 15:
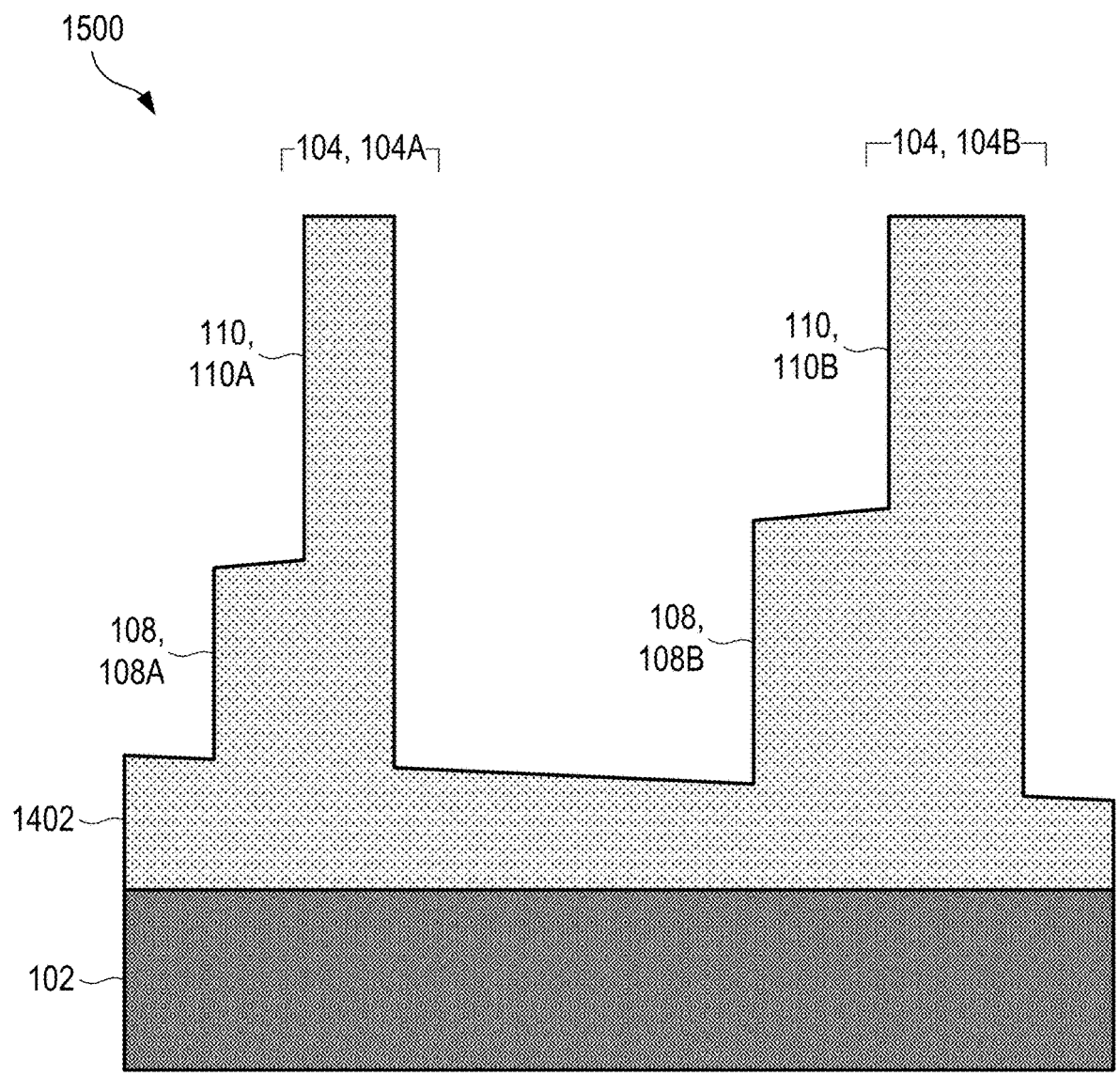
FIG. 15 shows a side-view cross-section of an illumination system after a twelfth stage of assembly.

FIG. 15 shows a side-view cross-section of an illumination system 1500 after a twelfth stage of assembly. The imprint 1402 has been attached to a light guide 102 of FIG. 1. The portions of the material layer 1302 that filled the first holes (FIGS. 9 and 10) form the lower elements 108 of the diffractive elements 104 defined by the imprint 1402. The portions of the material layer 1302 the filled the second holes (FIGS. 11 and 12) form the upper elements 110 of the diffractive elements 104 defined by the imprint 1402.

As explained above, the variations in layer thicknesses and hole sizes create the desired variations in at least one of size and/or shape in the diffractive elements 104. For example, a first diffractive element 104A includes first lower element 108A and first upper element 110A, while second diffractive element 104B includes second lower element 108B and second upper element 110B. The first lower element 108A and the second lower element 108B can have a different size and/or a different shape and the first upper element 110A and the second upper element 110B can have a different size and/or a different shape, as seen in the example of FIG. 15.

In some examples, the hole dimensions shown in FIGS. 9-12, which are achieved using the etchable substrate with non-uniform etchable layer thicknesses interleaved with etch stop layers, can utilize a unique composition of the substrate. In other words, using defined mask layers to expose an underlying etchable substrate or an etch stop layer, respectively, rendering each successive layer susceptible to either $SF_6$ or $CHF_3$ etching, may achieve aspect ratio apertures that might not be possible by other processes, such as etching a monolithic substrate, for example.

Although two etchable layers and two accompanying etch stop layers are shown in FIGS. 4-15, it will be understood that any suitable number of etchable layers and accompanying etch stop layers can also be used. Furthermore, the thickness profiles of respective layers may be modified according to the intended purpose.

Forming the diffractive elements 104 in the manner shown in FIGS. 4-15 can utilize wafer-level processes, which can reduce a cost of manufacturing devices that include the diffractive elements 104. Further, forming the diffractive elements 104 to have a variable size and/or variable shape can allow the diffractive elements 104 to extract light from the light guide to at least partially compensate for a reduction in optical power at increasing distances away from the light source, such as to present a more uniform brightness level to a user over the eyebox, which is the area (or volume) over which a user can perceive a projected image superimposed on the real-world view when moving their eye up, down, left and right.

It is worthwhile to clarify the use of the term etch stop layer. Whereas the configuration of FIGS. 4-15 includes explicit etch stop layers (e.g., a layer having a sole function as a stopping layer that is not etchable for a particular etch process step), there are also configurations possible that lack explicit etch stop layers and instead use layer materials and etchants selected such that one or more layers can additionally function as an etch stop layer. For example, a first layer material may be etchable by a first etchant but not a second etchant, and a second layer material may be etchable by the second etchant but not the first etchant. By forming a layered stack with alternating layers of the first layer material and the second layer material, layers formed with the first layer material can function as etch stops (using the second etchant) for the layers formed with the second layer material, and layers formed with the second layer material can function as etch stops (using the first etchant) for the layers formed with the first layer material. Further, a substrate formed from a substrate material can function as one of the layers in the layered stack, with regard to etching and functioning as an etch stop for another layer. A detailed example is provided below, with regard to FIGS. 16-23.

FIGS. 16-23 show another example of a manufacturing technique that can produce the illumination system, such as illumination system 100 of FIG. 1, including the diffractive elements 104 that can vary in at least one of size and shape over a surface area of a light guide. The technique of FIGS. 16-23 can produce other illumination systems as well. The technique of FIGS. 16-23 is but one manufacturing technique to produce the illumination system 100 of FIG. 1. Other manufacturing techniques can also be used.

Figure 16:
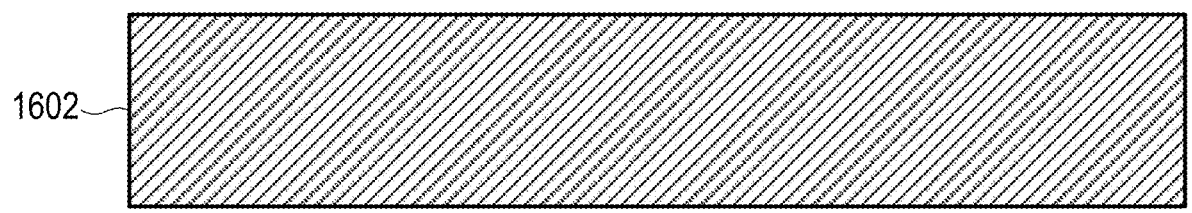
FIG. 16 shows a side-view cross-section of an illumination system after a first stage of assembly.

FIG. 16 shows a side-view cross-section of an illumination system 1600 after a first stage of assembly. In FIG. 16, a substrate 1602 is provided. In some examples, the substrate 1602 can include a layer of base material, such as silicon, quartz, glass, or another suitable material. In some examples, the base layer can have a thickness between about 0.1 mm and about 10 mm. In some examples, the base layer can be a wafer having a diameter of 100 mm, 150 mm, 200 mm, 300 mm, 400 mm, or another suitable value. During subsequent assembly stages, a thin film stack may be deposited on the substrate 1602, as will be described in more detail below.

Figure 17:
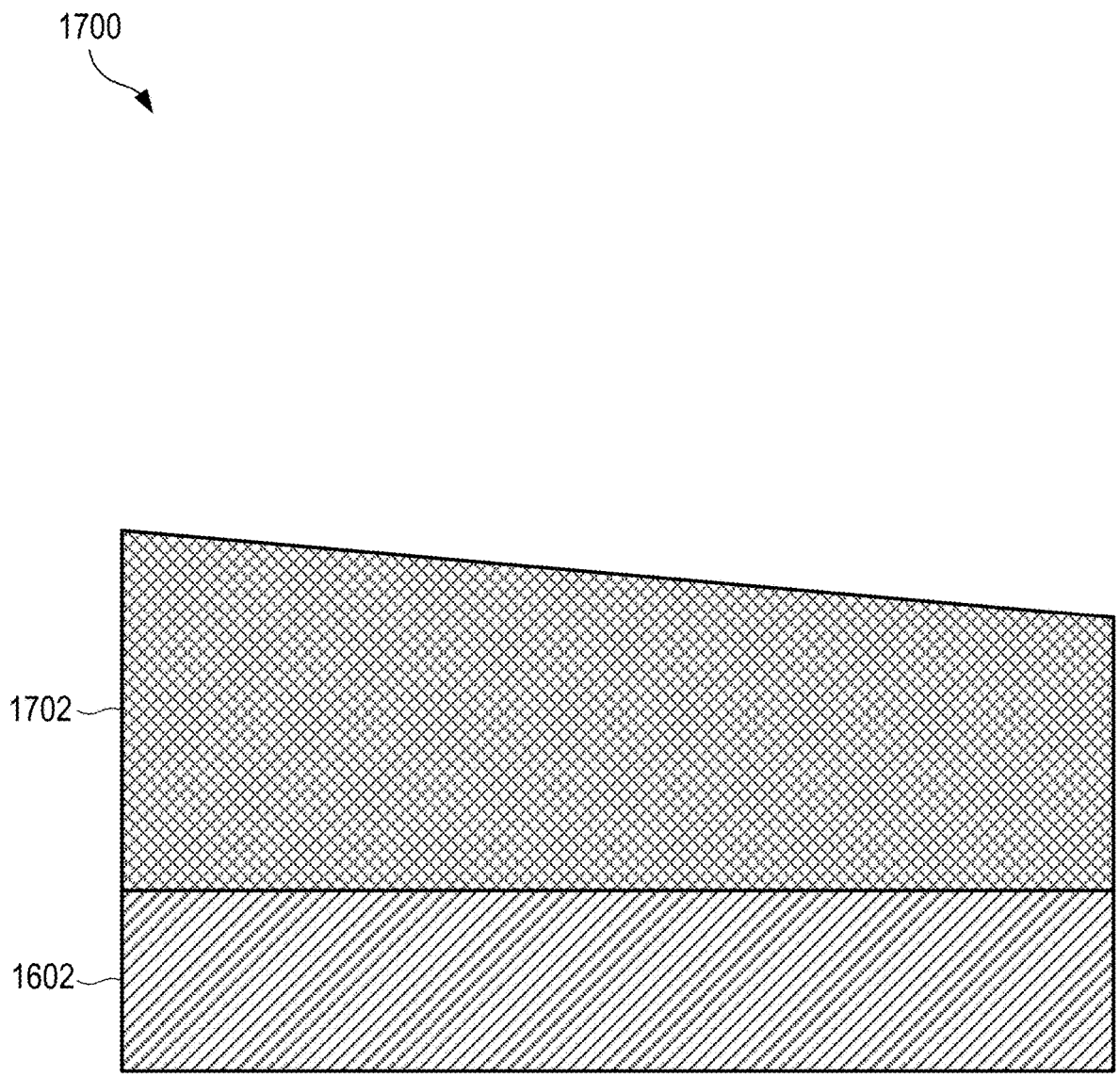
FIG. 17 shows a side-view cross-section of an illumination system after a second stage of assembly.

FIG. 17 shows a side-view cross-section of an illumination system 1700 after a second stage of assembly. In FIG. 17, a first layer 1702 has been deposited on the substrate 1602. In some examples, the first layer 1702 can be deposited via graded sputtering or another suitable technique, such that the first layer 1702 can have a non-uniform thickness. In some examples, the first layer 1702 can be an etch layer. In some examples, the first layer 1702 is formed from a material that is susceptible to etchant. In some examples, the first layer 1702 can be formed from amorphous silicon (Si), silicon dioxide ($SiO_2$), or another suitable material.

In some examples, the first layer 1702 can have a thickness that is greater than 25 nm, greater than 30 nm, greater than 35 nm, greater than 40 nm, greater than 45 nm, greater than 50 nm, greater than 55 nm, greater than 60 nm, greater than 65 nm, greater than 70 nm, greater than 75 nm, or has another suitable value of thickness. In some examples, the first layer 1702 can have a thickness that varies between about 10 nm and about 1000 nm across a width of the substrate 1602 (in the X-Y plane of FIGS. 1-3).

In some examples, the first layer 1702 can have a thickness profile having a linear gradient in a ratio of about 10:1 across a width of the substrate 1602. In some examples, the first layer 1702 can have a first region over which the layer thickness is a constant first value and a second region over which the layer thickness varies from the first value to a second value. In some examples, the first layer 1702 can have a thickness profile having a constant thickness of about 65 nm for about 20% of a width of the substrate 1602, with a linear taper from about 65 nm to about 25 nm for about 80% of the width of the substrate 1602. In some examples, the first layer 1702 can have a thickness profile having a constant thickness of about 50 nm for about 15% of a width of the substrate 1602, a constant thickness of about 65 nm thickness for about 5% of the width of the substrate 1602, a linear taper from about 65 nm to about 25 nm for about 80% of the width of the substrate 1602. In some examples, the first layer 1702 can have a thickness profile having an inverse square decay from about 65 nm to about 25 nm across a width of the substrate 1602. In some examples, the first layer 1702 can have a thickness profile having an exponential decay from about 65 nm to about 25 nm across a width of the substrate 1602. Other thickness profiles can also be used.

Figure 18:
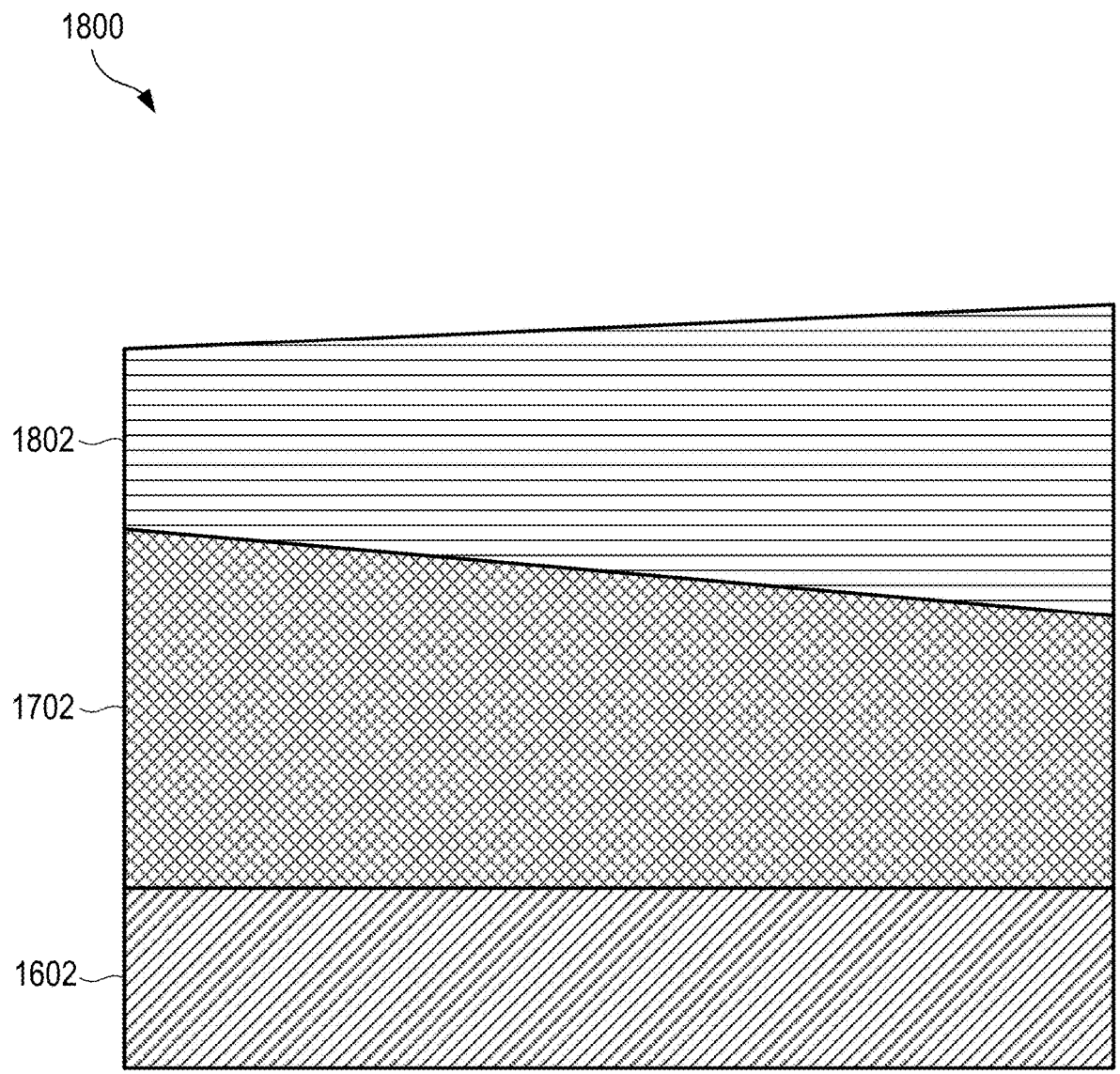
FIG. 18 shows a side-view cross-section of an illumination system after a third stage of assembly.

FIG. 18 shows a side-view cross-section of an illumination system 1800 after a third stage of assembly. In FIG. 18, a second layer 1802 has been deposited on the first layer 1702. In some examples, the second layer 1802 can be deposited via graded sputtering or another suitable technique, such that the second layer 1802 can have a non-uniform thickness. In some examples, the second layer 1802 can be an etch layer. In some examples, the second layer 1802 can be formed from a material that is susceptible to etchant (e.g., is etchable). In some examples, the second layer 1802 can be formed from amorphous silicon (Si), silicon dioxide ($SiO_2$), or another suitable material. In some examples, the first layer 1702 can be formed from one of amorphous silicon (Si) or silicon dioxide ($SiO_2$), and the second layer 1802 can be formed from the other of amorphous silicon (Si) or silicon dioxide ($SiO_2$). In this manner the first layer 1702 can function as an etch stop layer for the second layer 1802.

In some examples, the second layer 1802 can have a thickness that is greater than 25 nm, greater than 30 nm, greater than 35 nm, greater than 40 nm, greater than 45 nm, greater than 50 nm, greater than 55 nm, greater than 60 nm, greater than 65 nm, greater than 70 nm, greater than 75 nm, or has another suitable value of thickness. In some examples, the second layer 1802 can have a thickness that varies between about 10 nm and about 1000 nm across a width of the substrate 1602.

In some examples, the second layer 1802 can have a thickness profile having a linear gradient in a ratio of about 10:1 across a width of the substrate 1602. In some examples, the second layer 1802 can have a first region over which the layer thickness is a constant first value and a second region over which the layer thickness varies from the first value to a second value. In some examples, the second layer 1802 can have a thickness profile having a constant thickness of about 65 nm for about 20% of a width of the substrate 1602, with a linear taper from about 65 nm to about 25 nm for about 80% of the width of the substrate 1602. In some examples, the second layer 1802 can have a thickness profile having a constant thickness of about 50 nm for about 15% of a width of the substrate 1602, a constant thickness of about 65 nm thickness for about 5% of the width of the substrate 1602, a linear taper from about 65 nm to about 25 nm for about 80% of the width of the substrate 1602. In some examples, the second layer 1802 can have a thickness profile having an inverse square decay from about 65 nm to about 25 nm across a width of the substrate 1602. In some examples, the second layer 1802 can have a thickness profile having an exponential decay from about 65 nm to about 25 nm across a width of the substrate 1602. Other thickness profiles can also be used.

Figure 19:
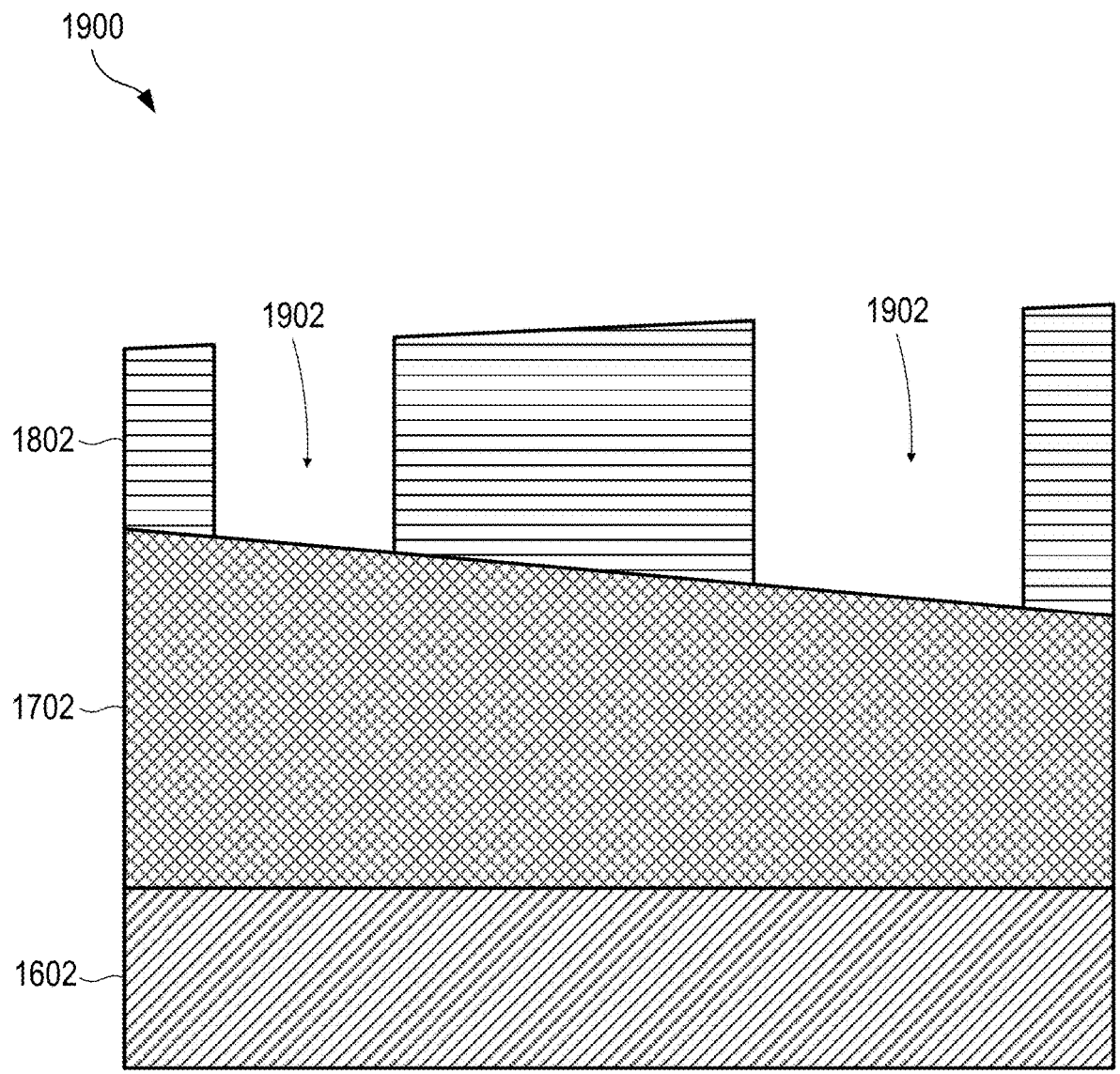
FIG. 19 shows a side-view cross-section of an illumination system after a fourth stage of assembly.

FIG. 19 shows a side-view cross-section of an illumination system 1900 after a fourth stage of assembly. A first mask layer (not shown) has been applied over the second layer 1802. Electron-beam lithography (or another suitable technique) has defined a first pattern in the first mask layer to define first areas. In some examples, the first areas correspond to areas of the first mask layers that have been removed. In other examples, the first areas correspond to areas of the first mask layer that remain after other areas of the first mask layer have been removed. The first areas can correspond to a combination of the lower cross-sectional area (LA), such as on the surface 208 (FIGS. 2 and 3) and the upper cross-sectional area (UA), such as on the surface 210 (FIGS. 2 and 3). In other words, the first areas can correspond to areas that include both the upper elements 110 and the lower elements 108. Subsequent stages will define second areas within the first areas, to distinguish the upper elements 110 from the lower elements 108.

After the first areas have been defined, the second layer 1802 can be exposed to a dry etching process, such as reactive ion etching (RIE), inductively coupled plasma etching (ICP), atomic layer etching (ALE), or deep reactive ion etching (DRIE). The etching can use an etchant that can etch the material of the second layer 1802 but not the material of the first layer 1702. For example, if the first layer 1702 is amorphous silicon (Si) and the second layer is silicon dioxide ($SiO_2$), the etchant can be trifluoromethane ($CHF_3$), which etches silicon dioxide but not amorphous silicon. As another example, if the first layer 1702 is silicon dioxide ($SiO_2$) and the second layer is amorphous silicon (Si), the etchant can be sulfur hexafluoride ($SF_6$), which etches amorphous silicon but not silicon dioxide. Other etchants and material can also be used.

After the second layer 1802 has been etched, such as through deep reactive ion etching, the second layer 1802 can have first holes 1902 in regions that correspond to the first areas.

Figure 20:
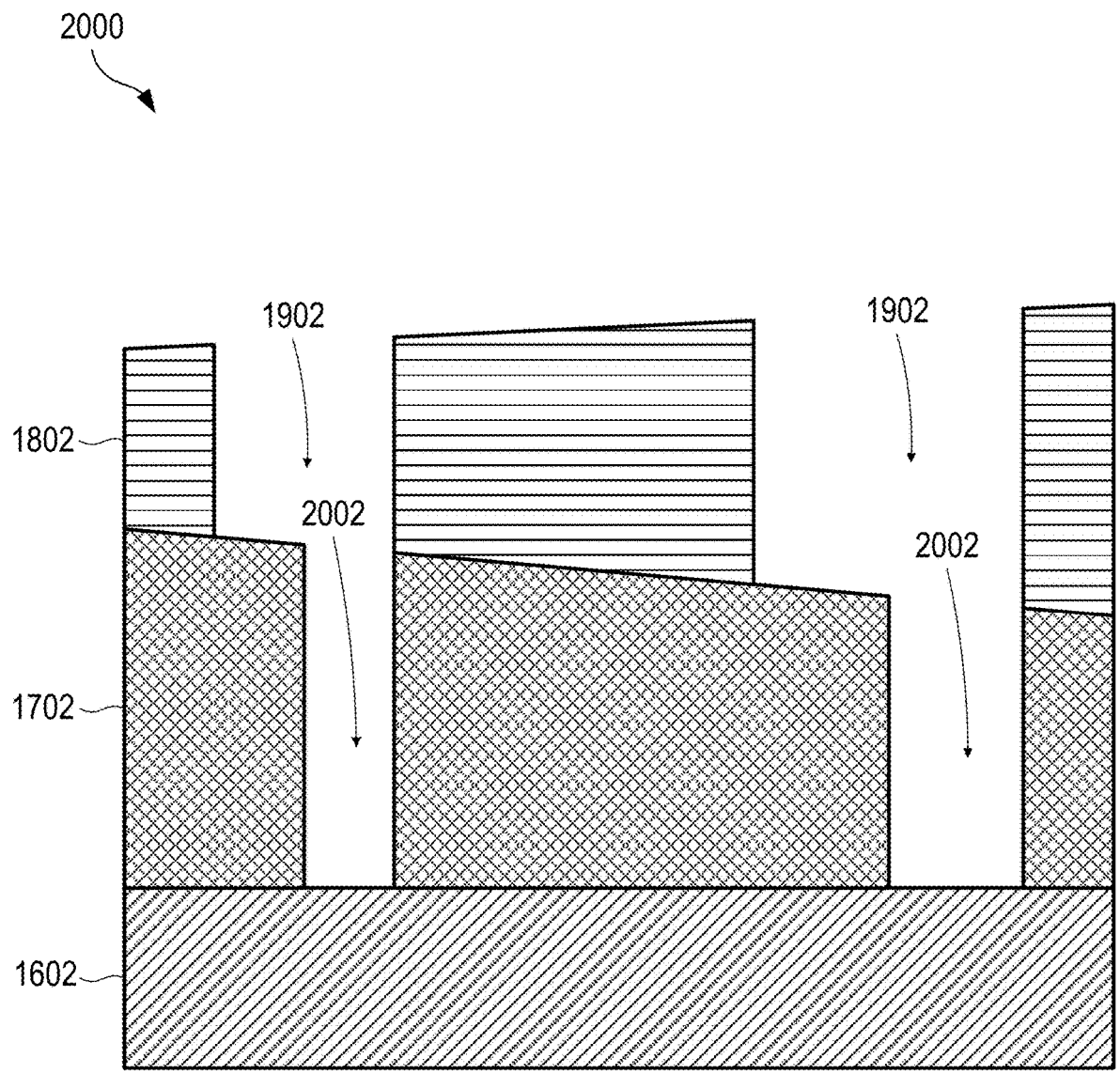
FIG. 20 shows a side-view cross-section of an illumination system after a fifth stage of assembly.

FIG. 20 shows a side-view cross-section of an illumination system 2000 after a fifth stage of assembly. A second mask layer (not shown) has been applied over the first layer 1702. Electron-beam lithography (or another suitable technique) has defined a second pattern in the second mask layer to define second areas within respective first holes 1902. Each second area can be smaller than a corresponding first area.

In some examples, the second areas correspond to areas of the second mask layers that have been removed. In other examples, the second areas correspond to areas of the second mask layer that remain after other areas of the second mask layer have been removed. The second areas can correspond to the upper cross-sectional area (UA), such as on the surface 210 (FIGS. 2 and 3).

After the second areas have been defined, the first layer 1702 can be exposed to a dry etching process, such as reactive ion etching (RIE), inductively coupled plasma etching (ICP), atomic layer etching (ALE), or deep reactive ion etching (DRIE). The etching can use an etchant as discussed above. The etchant can etch the first layer 1702 fully to the substrate 1602. The substrate 1602 can be resistant to etching by the etchant and can therefore function as an etch stop layer.

After the first layer 1702 has been etched, such as with deep reactive ion etching, the first layer 1702 can have second holes 2002 that correspond to the second areas.

Figure 21:
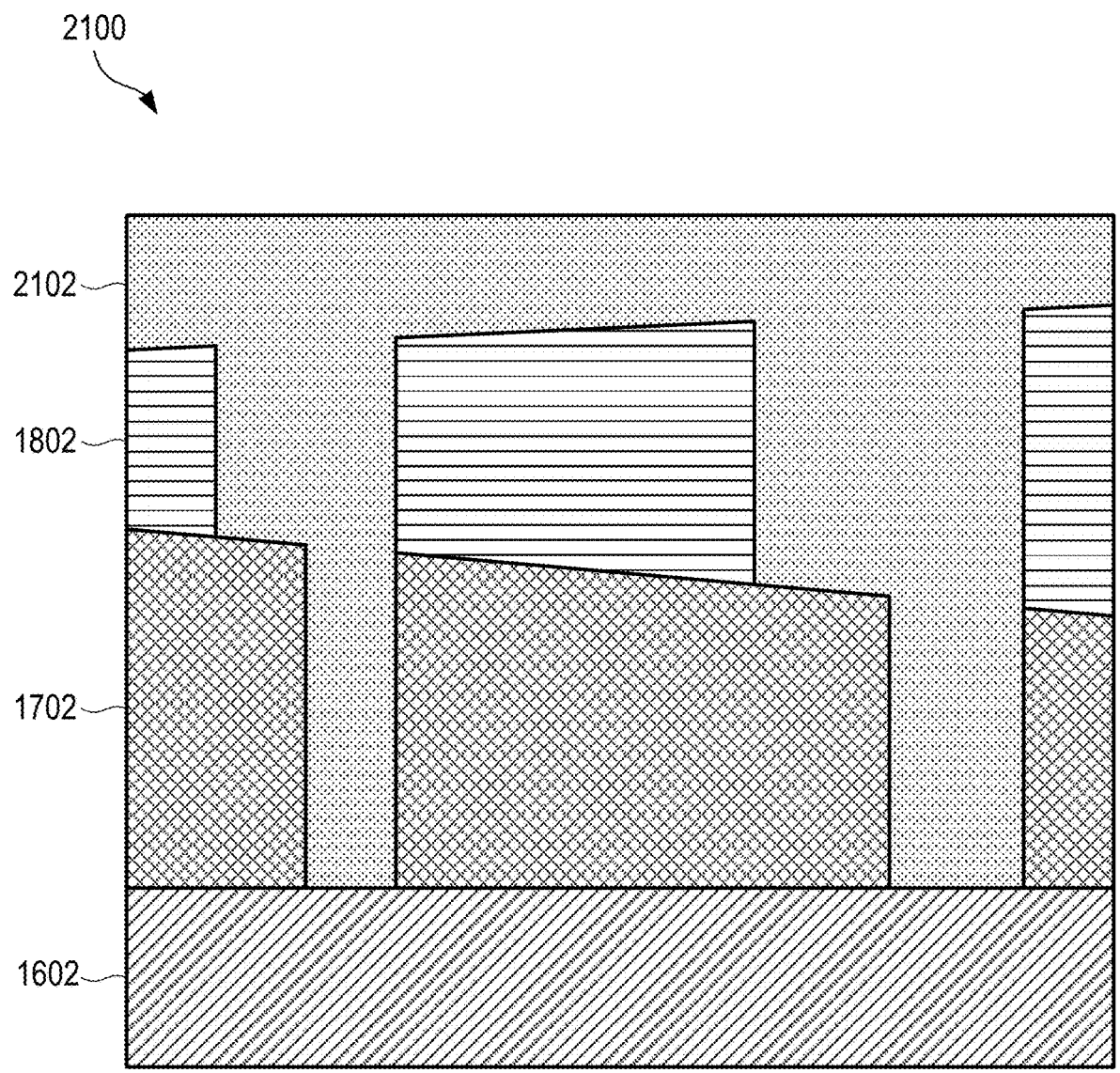
FIG. 21 shows a side-view cross-section of an illumination system after a sixth stage of assembly.

FIG. 21 shows a side-view cross-section of an illumination system 2100 after a sixth stage of assembly. A material layer 2102 has been deposited over the second layer 1802 and has filled in the volumes defined by the earlier etching, to form an imprint of the etched thin film stack. In the imprint, material of the material layer 2102 that fills the first holes 1902 and the second holes 2002 will form a plurality of diffractive elements on the imprint.

Figure 22:
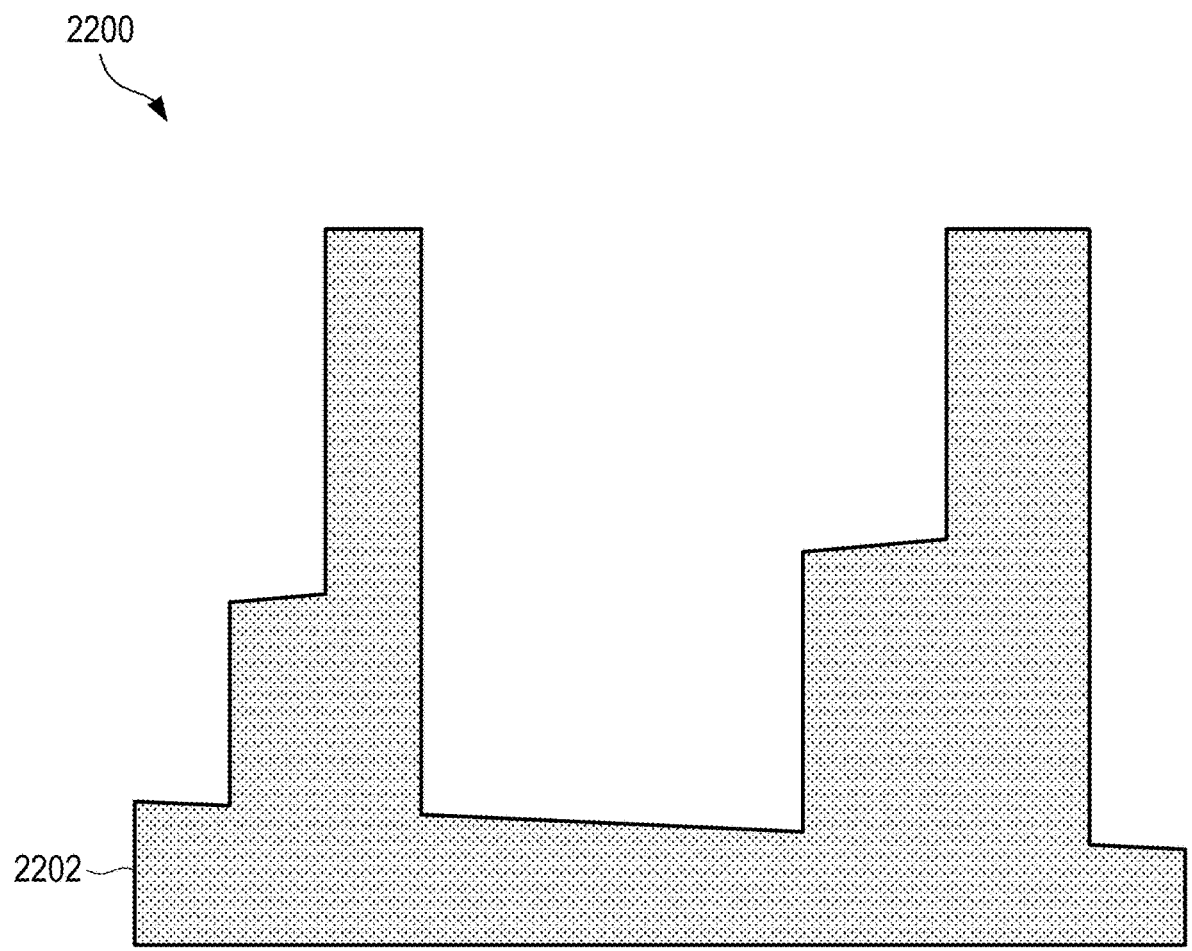
FIG. 22 shows a side-view cross-section of an illumination system after a seventh stage of assembly.

FIG. 22 shows a side-view cross-section of an illumination system 2200 after a seventh stage of assembly. The material layer 2102 has been separated from the thin film stack, which includes the substrate 1602, the first layer 1702, and the second layer 1802, to form the imprint 2202. The imprint 2202 has been inverted top-to-bottom in FIG. 21, compared to the orientations shown in FIGS. 16-21.

Figure 23:
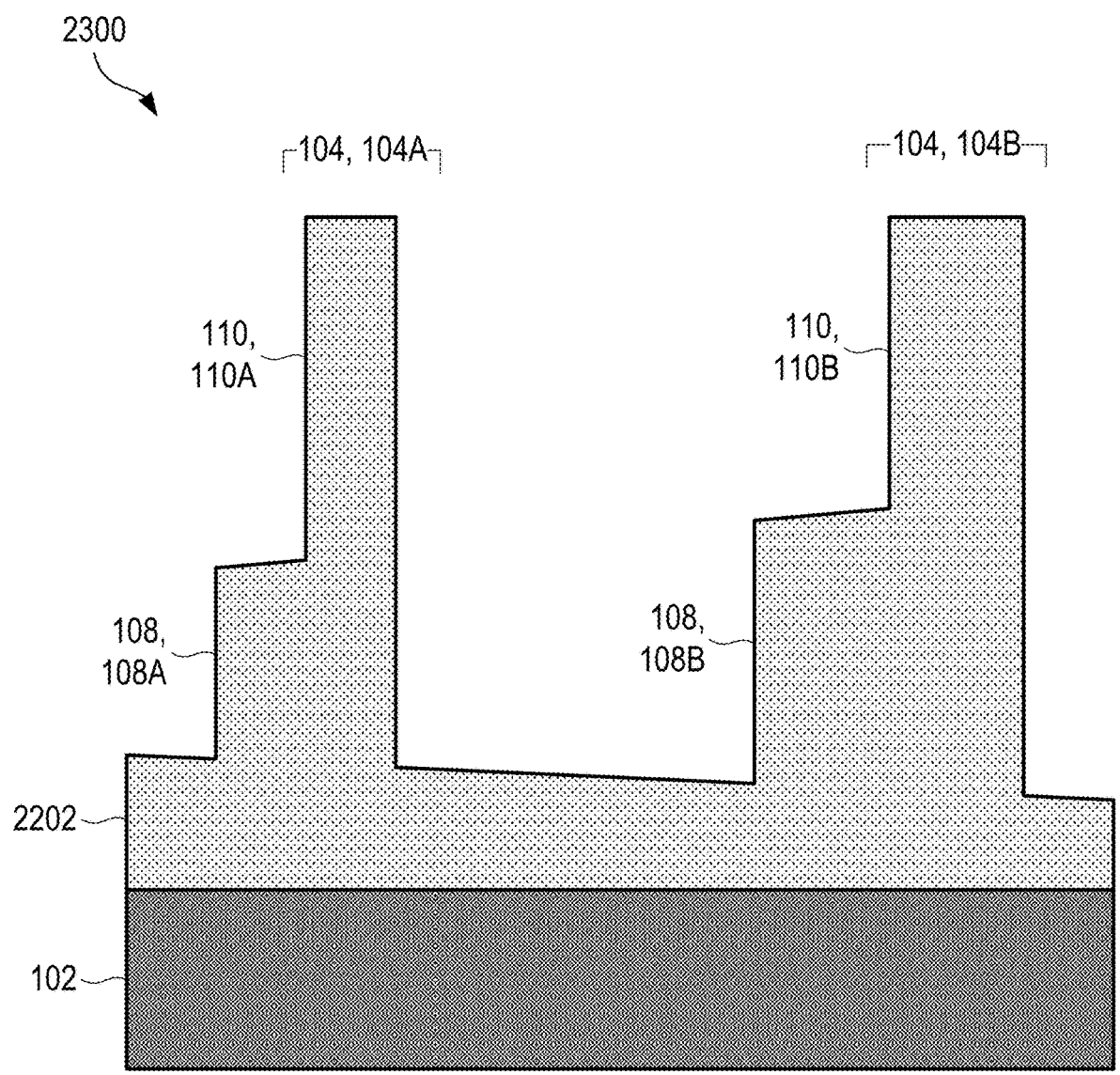
FIG. 23 shows a side-view cross-section of an illumination system after an eighth stage of assembly.

FIG. 23 shows a side-view cross-section of an illumination system 2300 after an eighth stage of assembly. The imprint 2202 has been attached to a light guide 102. The material of the material layer 2102 that fills first holes first holes 1902 can form the lower elements 108 of the diffractive elements 104 defined by the imprint 2202. The material of the material layer 2102 that fills second holes second holes 2002 can form the upper elements 110 of the diffractive elements 104 defined by the imprint 2202.

As explained above, the variations in layer thicknesses and hole sizes can create the desired variations in at least one of size and shape in the diffractive elements 104. For example, a first diffractive element 104A can include a first lower element 108A and a first upper element 110A. A second diffractive element 104B can include a second lower element 108B and a second upper element 110B. The first lower element 108A and the second lower element 108B can have a different size and/or a different shape. The first upper element 110A and the second upper element 110B can have a different size and/or a different shape.

In some examples, the hole dimensions shown in FIGS. 19-20, which are achieved using the etchable substrate with non-uniform etchable layer thicknesses interleaved with etch stop layers, can utilize a unique composition of the substrate. In other words, using defined mask layers to expose an underlying etchable substrate or an etch stop layer, respectively, rendering each successive layer susceptible to either $SF_6$ or $CHF_3$ etching, may achieve aspect ratio apertures that might not be possible by other processes, such as etching a monolithic substrate, for example.

Although two etchable layers are shown in FIGS. 16-23, it will be understood that any suitable number of etchable layers can also be used. Furthermore, the thickness profiles of respective layers may be modified according to the intended purpose.

Forming the diffractive elements 104 in the manner shown in FIGS. 16-23 can utilize wafer-level processes, which can reduce a cost of manufacturing devices that include the diffractive elements 104. Further, forming the diffractive elements 104 to have a variable size and/or variable shape can allow the diffractive elements 104 to extract light from the light guide to at least partially compensate for a reduction in optical power at increasing distances away from the light source, such as to present a more uniform brightness level to a user.

In some examples, the illumination system 2000 as depicted in FIG. 20 may be used without further processing. The materials used to define layers 1702 and 1802 may have sufficiently similar refractive indices that light propagating along the length of the light guide by internal reflection may be selectively diffracted out of the light guide with increasing efficiency as the distance from the point of light entry increases.

Figure 24:
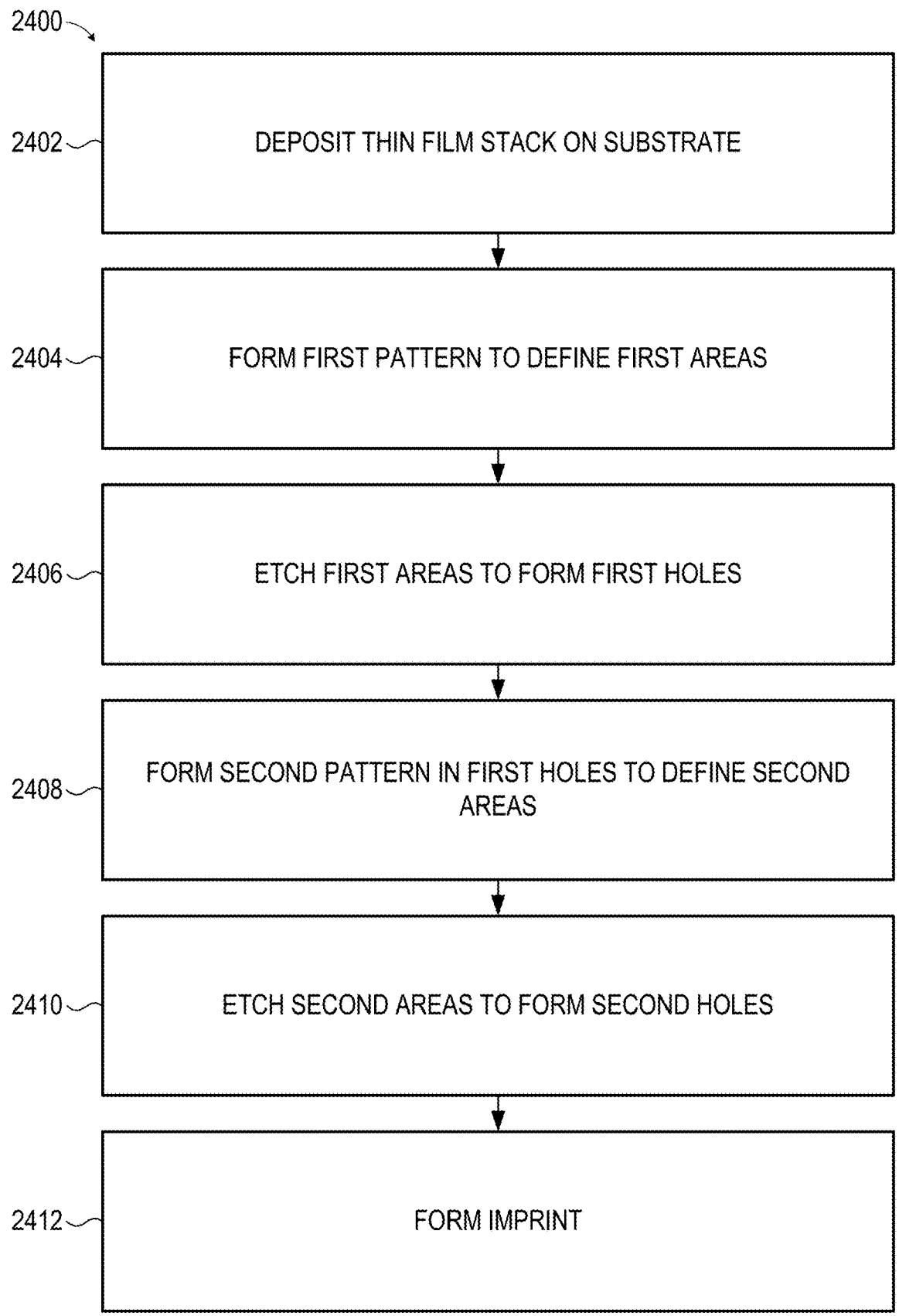
FIG. 24 shows a flow chart for an example of a method for generating a diffractive optical element.

FIG. 24 shows a flow chart for an example of a method 2400 for generating a diffractive optical element, such as the illumination system 100 of FIG. 1 or other suitable diffractive optical elements. The method 2400 is but one example of a method for generating a diffractive optical element. Other suitable methods can also be used.

At operation 2402, the method 2400 can deposit a thin film stack on a substrate, such as substrate 402 or substrate 1602. The thin film stack can include a first layer, such as layer 602 or layer 1702, and a second layer, such as layer 802 or layer 1802. The first layer can be disposed between the substrate and the second layer. The first layer can have a non-uniform thickness. The second layer can have a non-uniform thickness.

At operation 2404, the method 2400 can form a first pattern on the second layer to define first areas.

At operation 2406, the method 2400 can etch the second layer in the first areas to form first holes.

At operation 2408, the method 2400 can form a second pattern on the first layer in the first holes. The second pattern can define second areas.

At operation 2410, the method 2400 can etch the first layer in the second areas to form second holes. The second holes can extend fully through the first layer to depths that correspond to the non-uniform thickness of the first layer.

At operation 2412, the method 2400 can form an imprint of the etched thin film stack such that the first holes and the second holes form a plurality of diffractive elements on the imprint.

In some examples, such as the configuration of FIGS. 16-23, the first layer can be formed from a first material and is deposited by graded sputtering. In some examples, such as the configuration of FIGS. 16-23, the second layer can be formed from a second material different from the first material and is deposited by graded sputtering. In some examples, such as the configuration of FIGS. 16-23, the second layer can be etched with deep reactive ion etching with a first etching material that etches the second material but not the first material. In some examples, such as the configuration of FIGS. 16-23, the first layer can be etched with deep reactive ion etching with a second etching material that etches the first material but not the second material. In some examples, such as the configuration of FIGS. 16-23, the first pattern and the second pattern are formed with electron-beam lithography.

In some examples, such as the configuration of FIGS. 16-23, the second layer is deposited directly on the first layer with no intervening layers between the first layer and the second layer.

In some examples, such as the configuration of FIGS. 16-23, the first layer is deposited directly on a substrate with no intervening layers between the substrate and the first layer. In some examples, such as the configuration of FIGS. 16-23, the second etching material may not etch a material of the substrate.

In some examples, such as the configuration of FIGS. 16-23, the first material is amorphous silicon (Si), the second material is silicon dioxide ($SiO_2$), the first etching material is trifluoromethane ($CHF_3$), and the second etching material is sulfur hexafluoride ($SF_6$).

In some examples, such as the configuration of FIGS. 16-23, the first material is silicon dioxide ($SiO_2$), the second material is amorphous silicon (Si), the first etching material is sulfur hexafluoride ($SF_6$), and the second etching material is trifluoromethane ($CHF_3$).

In some examples, such as the configuration of FIGS. 4-15, the first layer can be formed from a first material and can be deposited by graded sputtering. The second layer can be formed from the first material and can be deposited by graded sputtering. A third layer can be disposed in the thin film stack between the first layer and the second layer. The third layer can be formed from a second material different from the first material. The first layer and the second layer can be etched with deep reactive ion etching with a first etching material that etches the first material but not the second material. The method 2400 can optionally further include etching the third layer in the first areas with deep reactive ion etching with a second etching material that etches the second material but not the first material, to deepen the first holes to depths that correspond to the non-uniform thickness of the second layer plus a thickness of the third layer.

In some examples, such as the configuration of FIGS. 4-15, a fourth layer can be disposed in the thin film stack between the substrate and the first layer. The fourth layer can be formed from the second material. The method 2400 can optionally further include etching the fourth layer in the second areas with deep reactive ion etching with the second etching material, to deepen the second holes to depths that correspond to the non-uniform thickness of the first layer plus a thickness of the fourth layer.

In some examples, such as the configuration of FIGS. 4-15, the third layer has a uniform thickness, the fourth layer has a uniform thickness, and the third layer and the fourth layer are deposited by sputtering.

In some examples, such as the configuration of FIGS. 4-15, the fourth layer can be deposited on a substrate with no intervening layers between the substrate and the fourth layer. The second etching material may not etch a material of the substrate.

In some examples, such as the configuration of FIGS. 4-15, the first material can be amorphous silicon (Si), the second material can be silicon dioxide ($SiO_2$), the first etching material can be trifluoromethane ($CHF_3$), and the second etching material is sulfur hexafluoride ($SF_6$).

Figure 25:
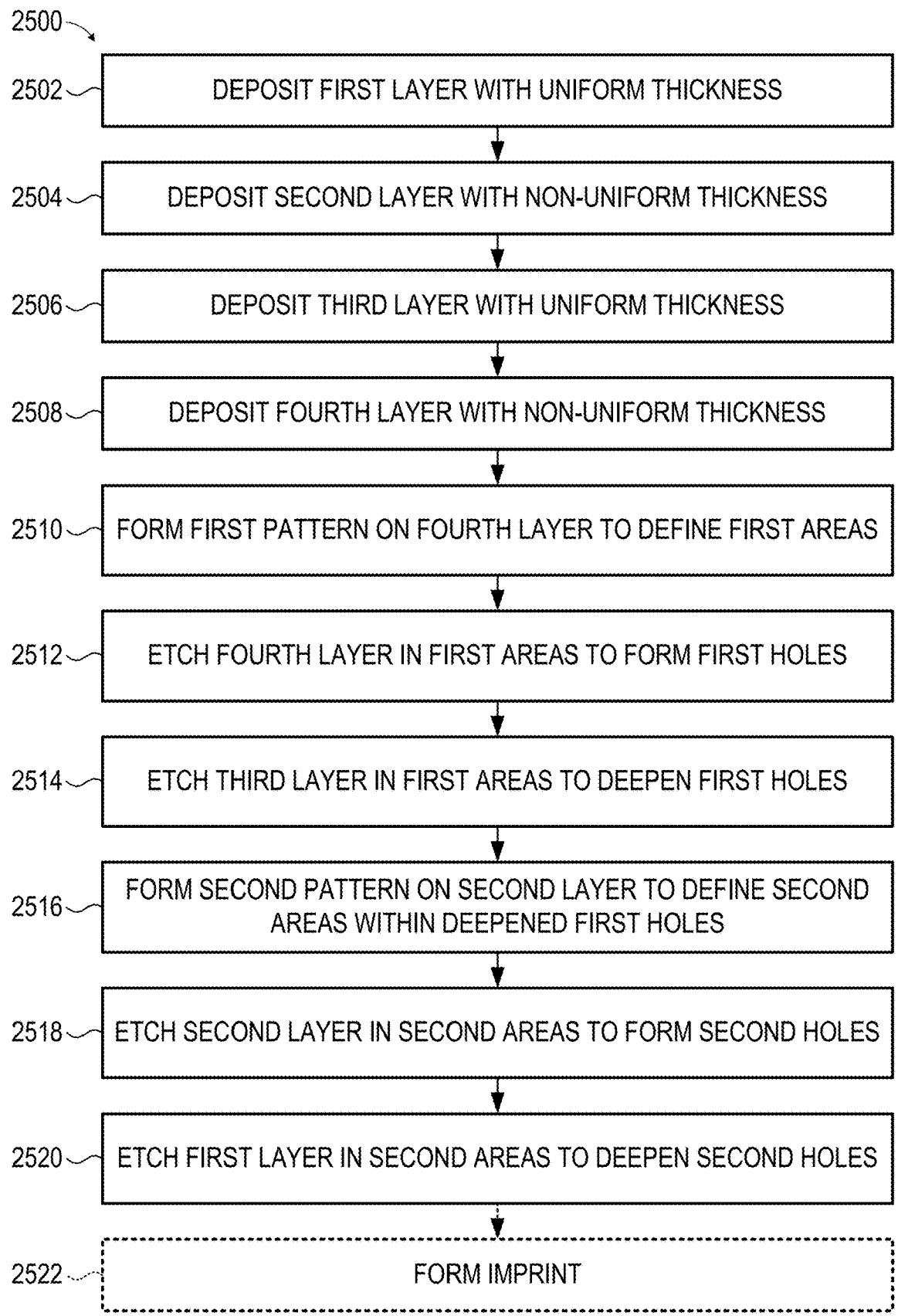
FIG. 25 shows a flow chart for an example of a method for generating a diffractive optical element.

FIG. 25 shows a flow chart for an example of a method 2500 for generating a diffractive optical element, such as the illumination system 100 of FIG. 1 or other suitable diffractive optical elements. The method 2500 is but one example of a method for generating a diffractive optical element. Other suitable methods can also be used.

At operation 2502, the method 2500 can deposit, via sputtering, a first layer of silicon dioxide ($SiO_2$) on a substrate. The first layer can have a uniform thickness.

At operation 2504, the method 2500 can deposit, via graded sputtering, a second layer of amorphous silicon (Si) on the first layer. The second layer can have a non-uniform thickness.

At operation 2506, the method 2500 can deposit, via sputtering, a third layer of silicon dioxide on the second layer. The third layer can have a uniform thickness.

At operation 2508, the method 2500 can deposit, via graded sputtering, a fourth layer of amorphous silicon on the third layer. The fourth layer can have a non-uniform thickness.

At operation 2510, the method 2500 can form, with electron-beam lithography, a first pattern on the fourth layer to define first areas.

At operation 2512, the method 2500 can etch, with deep reactive ion etching using sulfur hexafluoride ($SF_6$), the fourth layer in the first areas to form first holes.

At operation 2514, the method 2500 can etch, with deep reactive ion etching using trifluoromethane ($CHF_3$), the third layer in the first areas to deepen the first holes to form deepened first holes. The deepened first holes can have depths that correspond to the non-uniform thickness of the fourth layer plus the uniform thickness of the third layer.

At operation 2516, the method 2500 can form, with electron-beam lithography, a second pattern on the second layer within the deepened first holes to define second areas within respective deepened first holes.

At operation 2518, the method 2500 can etch, with deep reactive ion etching using sulfur hexafluoride, the second layer in the second areas to form second holes.

At operation 2520, the method 2500 can etch, with deep reactive ion etching using trifluoromethane, the first layer in the second areas to deepen the second holes to form deepened second holes. The deepened second holes can have depths that correspond to the non-uniform thickness of the second layer plus the uniform thickness of the first layer.

At optional operation 2522, the method 2500 can form an imprint of the fourth layer, the third layer, the second layer, and the first layer such that the first deepened holes and the second deepened holes form a plurality of diffractive elements on the imprint. Each diffractive element can include a lower element extending from a base of the imprint and an upper element extending from the lower element. The lower elements can have lower heights that correspond to the non-uniform thickness of the fourth layer plus the uniform thickness of the third layer. The lower elements can have lower cross-sectional areas that correspond to the first areas. The upper elements can have upper heights that correspond to the non-uniform thickness of the second layer plus the uniform thickness of the first layer. The upper elements can have upper cross-sectional areas that correspond to the second areas.

In some examples, such as the configuration of FIGS. 4-15, the second layer can have a thickness that varies monotonically from a first edge of the imprint to a second edge of the imprint. The fourth layer can have a thickness that varies monotonically from the first edge of the imprint to the second edge of the imprint.

The structures and methods as described with reference to FIGS. 1-25 may be used to prepare wafers, as will be understood by one skilled in the art of nanofabrication technology, to enable the preparation of multiple diffractive waveguide combiners (DWC) in a single operation. Each wafer can have a sufficient area to accommodate multiple DWCs. Each region of the wafer may be configured with specifically profiled etchable layers, as described with reference to FIGS. 1-25, which are specific to a particular DWC nanostructure arrangement.

In some examples, each wafer may be used to produce a number of identical DWCs, with the wafer being configured with identical regions with respect to the variation in thickness profile across the region of each DWC.

In other examples, each wafer may be configured to prepare DWCs that are specific to a specific wavelength of light, for example, red, green, and blue, or red, green, cyan, and violet. In these examples, a single wafer may yield sufficient number of DWC elements necessary to produce a final waveguide design that includes stacked red, green, and blue, or stacked red, green, cyan, and violet-specific DWCs which can achieve a full color image when light is introduced.

The wafers produced according to the methods discussed above may subsequently be used in a step and repeat nano imprint lithography process to produce large quantities of DWC devices.

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system can comprise: a light guide; and a plurality of diffractive elements positioned over an area of a light-guiding surface of the light guide, each diffractive element including a lower element extending from the light-guiding surface and an upper element extending from the lower element, the lower element having a lower height in a direction orthogonal to the light-guiding surface of the light guide, the lower element having a lower cross-sectional area in a plane parallel to the light-guiding surface of the light guide, the upper element having an upper height in the direction orthogonal to the light-guiding surface of the light guide, the upper element having an upper cross-sectional area in the plane parallel to the light-guiding surface of the light guide, the upper cross-sectional area being less than the lower cross-sectional area, the lower heights and the upper heights of the plurality of diffractive elements varying over the area of the light-guiding surface of the light guide.

In Example 2, the illumination system of Example 1 can optionally further comprise a light source disposed at a first edge of the light-guiding surface of the light guide and configured to direct light into the light guide, the lower heights and the upper heights of the plurality of diffractive elements varying as a function of distance away from the first edge of the light-guiding surface of the light guide.

In Example 3, the illumination system of any one of Examples 1-2 can optionally be further configured such that: the light guide is configured to guide light from the light source as guided light; the diffractive elements of the plurality of diffractive elements are configured to extract guided light out of the light guide as respective extracted light portions; and the diffractive elements of the plurality of diffractive elements have lower heights, lower cross-sectional areas, upper heights, and upper cross-sectional areas selected such that the extracted light portions have values of optical power per area that are substantially equal.

In Example 4, the illumination system of any one of Examples 1-3 can optionally be further configured such that the lower heights of the plurality of diffractive elements vary monotonically as a function of distance away from the first edge of the light-guiding surface of the light guide.

In Example 5, the illumination system of any one of Examples 1-4 can optionally be further configured such that the upper heights of the plurality of diffractive elements vary monotonically as a function of distance away from the first edge of the light-guiding surface of the light guide.

In Example 6, the illumination system of any one of Examples 1-5 can optionally be further configured such that the lower element and the upper element are substantially orthogonal to the light-guiding surface of the light guide.

In Example 7, a method for generating a diffractive optical element can comprise: depositing a thin film stack on a substrate, the thin film stack including a first layer and a second layer, the first layer being disposed between the substrate and the second layer, the first layer having a non-uniform thickness, the second layer having a non-uniform thickness; forming a first pattern on the second layer to define first areas; etching the second layer in the first areas to form first holes; forming a second pattern on the first layer in the first holes, the second pattern defining second areas, each second area being smaller than a corresponding first area; etching the first layer in the second areas to form second holes, the second holes extending fully through the first layer to depths that correspond to the non-uniform thickness of the first layer; and forming an imprint of the etched thin film stack such that the first holes and the second holes form a plurality of diffractive elements on the imprint.

In Example 8, the method of Example 7 can optionally be configured such that: the first layer is formed from a first material and is deposited by graded sputtering; the second layer is formed from a second material different from the first material and is deposited by graded sputtering; the second layer is etched with deep reactive ion etching with a first etching material that etches the second material but not the first material; the first layer is etched with deep reactive ion etching with a second etching material that etches the first material but not the second material; and the first pattern and the second pattern are formed with electron-beam lithography.

In Example 9, the method of any one of Examples 7-8 can optionally be configured such that the second layer is deposited directly on the first layer with no intervening layers between the first layer and the second layer.

In Example 10, the method of any one of Examples 7-9 can optionally be configured such that: the first layer is deposited directly on a substrate with no intervening layers between the substrate and the first layer; and the second etching material does not etch a material of the substrate.

In Example 11, the method of any one of Examples 7-10 can optionally be configured such that: the first material is amorphous silicon (Si); the second material is silicon dioxide (SiO2); the first etching material is trifluoromethane (CHF3); and the second etching material is sulfur hexafluoride (SF6).

In Example 12, the method of any one of Examples 7-11 can optionally be configured such that: the first material is silicon dioxide (SiO2); the second material is amorphous silicon (Si); the first etching material is sulfur hexafluoride (SF6); and the second etching material is trifluoromethane (CHF3).

In Example 13, the method of any one of Examples 7-12 can optionally be configured such that: the first layer is formed from a first material and is deposited by graded sputtering; the second layer is formed from the first material and is deposited by graded sputtering; a third layer is disposed in the thin film stack between the first layer and the second layer, the third layer being formed from a second material different from the first material; the first layer and the second layer are etched with deep reactive ion etching with a first etching material that etches the first material but not the second material; and the method further comprises etching the third layer in the first areas with deep reactive ion etching with a second etching material that etches the second material but not the first material, to deepen the first holes to depths that correspond to the non-uniform thickness of the second layer plus a thickness of the third layer.

In Example 14, the method of any one of Examples 7-13 can optionally be configured such that: a fourth layer is disposed in the thin film stack between the substrate and the first layer, the fourth layer being formed from the second material; and the method further comprises etching the fourth layer in the second areas with deep reactive ion etching with the second etching material, to deepen the second holes to depths that correspond to the non-uniform thickness of the first layer plus a thickness of the fourth layer.

In Example 15, the method of any one of Examples 7-14 can optionally be configured such that: the third layer has a uniform thickness; the fourth layer has a uniform thickness; and the third layer and the fourth layer are deposited by sputtering.

In Example 16, the method of any one of Examples 7-15 can optionally be configured such that: the fourth layer is deposited on a substrate with no intervening layers between the substrate and the fourth layer; and the second etching material does not etch a material of the substrate.

In Example 17, the method of any one of Examples 7-16 can optionally be configured such that: the first material is amorphous silicon (Si); the second material is silicon dioxide (SiO2); the first etching material is trifluoromethane (CHF3); and the second etching material is sulfur hexafluoride (SF6).

In Example 18, a method for generating a diffractive optical element can comprise: depositing, via sputtering, a first layer of silicon dioxide (SiO2) on a substrate, the first layer having a uniform thickness; depositing, via graded sputtering, a second layer of amorphous silicon (Si) on the first layer, the second layer having a non-uniform thickness; depositing, via sputtering, a third layer of silicon dioxide on the second layer, the third layer having a uniform thickness; depositing, via graded sputtering, a fourth layer of amorphous silicon on the third layer, the fourth layer having a non-uniform thickness; forming, with electron-beam lithography, a first pattern on the fourth layer to define first areas; etching, using sulfur hexafluoride (SF6), the fourth layer in the first areas to form first holes; etching, using trifluoromethane (CHF3), the third layer in the first areas to deepen the first holes to form deepened first holes, the deepened first holes having depths that correspond to the non-uniform thickness of the fourth layer plus the uniform thickness of the third layer; forming, with electron-beam lithography, a second pattern on the second layer within the deepened first holes to define second areas within respective deepened first holes; etching, using sulfur hexafluoride, the second layer in the second areas to form second holes; and etching, using trifluoromethane, the first layer in the second areas to deepen the second holes to form deepened second holes, the deepened second holes having depths that correspond to the non-uniform thickness of the second layer plus the uniform thickness of the first layer.

In Example 19, the method of Example 18 can further comprise: forming an imprint of the fourth layer, the third layer, the second layer, and the first layer such that the first deepened holes and the second deepened holes form a plurality of diffractive elements on the imprint, each diffractive element including a lower element extending from a base of the imprint and an upper element extending from the lower element, the lower elements having lower heights that correspond to the non-uniform thickness of the fourth layer plus the uniform thickness of the third layer, the lower elements having lower cross-sectional areas that correspond to the first areas, the upper elements having upper heights that correspond to the non-uniform thickness of the second layer plus the uniform thickness of the first layer, the upper elements having upper cross-sectional areas that correspond to the second areas.

In Example 20, the method of any one of Examples 18-19 can optionally be configured such that: the second layer has a thickness that varies monotonically from a first edge of the imprint to a second edge of the imprint; and the fourth layer has a thickness that varies monotonically from the first edge of the imprint to the second edge of the imprint.

What is claimed is:

1. A method for generating a diffractive optical element, the method comprising:
depositing a thin film stack on a substrate, the thin film stack including a first layer and a second layer, the first layer being disposed between the substrate and the second layer, the first layer having a non-uniform thickness, the second layer having a non-uniform thickness;

forming a first pattern on the second layer to define first areas;

etching the second layer in the first areas to form first holes;

forming a second pattern on the first layer in the first holes, the second pattern defining second areas, each second area being smaller than a corresponding first area;

etching the first layer in the second areas to form second holes, the second holes extending fully through the first layer to depths that correspond to the non-uniform thickness of the first layer; and forming an imprint of the etched thin film stack such that the first holes and the second holes form a plurality of diffractive elements on the imprint.

2. The method of claim 1, wherein:
the first layer is formed from a first material and is deposited by graded sputtering;
the second layer is formed from a second material different from the first material and is deposited by graded sputtering;
the second layer is etched with deep reactive ion etching with a first etching material that etches the second material but not the first material;
the first layer is etched with deep reactive ion etching with a second etching material that etches the first material but not the second material; and
the first pattern and the second pattern are formed with electron-beam lithography.

3. The method of claim 2, wherein the second layer is deposited directly on the first layer with no intervening layers between the first layer and the second layer.

4. The method of claim 2, wherein:
the first layer is deposited directly on a substrate with no intervening layers between the substrate and the first layer; and
the second etching material does not etch a material of the substrate.

5. The method of claim 2, wherein:
the first material is amorphous silicon (Si);
the second material is silicon dioxide ($SiO_2$);
the first etching material is trifluoromethane ($CHF_3$); and
the second etching material is sulfur hexafluoride ($SF_6$).

6. The method of claim 2, wherein:
the first material is silicon dioxide ($SiO_2$);
the second material is amorphous silicon (Si);
the first etching material is sulfur hexafluoride ($SF_6$); and
the second etching material is trifluoromethane ($CHF_3$).

7. The method of claim 1, wherein:
the first layer is formed from a first material and is deposited by graded sputtering;
the second layer is formed from the first material and is deposited by graded sputtering;
a third layer is disposed in the thin film stack between the first layer and the second layer, the third layer being formed from a second material different from the first material;
the first layer and the second layer are etched with deep reactive ion etching with a first etching material that etches the first material but not the second material; and
the method further comprises etching the third layer in the first areas with deep reactive ion etching with a second etching material that etches the second material but not the first material, to deepen the first holes to depths that correspond to the non-uniform thickness of the second layer plus a thickness of the third layer.

8. The method of claim 7, wherein:
a fourth layer is disposed in the thin film stack between the substrate and the first layer, the fourth layer being formed from the second material; and
the method further comprises etching the fourth layer in the second areas with deep reactive ion etching with the second etching material, to deepen the second holes to depths that correspond to the non-uniform thickness of the first layer plus a thickness of the fourth layer.

9. The method of claim 8, wherein:
the third layer has a uniform thickness;
the fourth layer has a uniform thickness; and
the third layer and the fourth layer are deposited by sputtering.

10. The method of claim 8, wherein:
the fourth layer is deposited on a substrate with no intervening layers between the substrate and the fourth layer; and
the second etching material does not etch a material of the substrate.

11. The method of claim 8, wherein:
the first material is amorphous silicon (Si);
the second material is silicon dioxide ($SiO_2$);
the first etching material is trifluoromethane ($CHF_3$); and
the second etching material is sulfur hexafluoride ($SF_6$).

12. A method for generating a diffractive optical element, the method comprising:
depositing, via sputtering, a first layer of silicon dioxide ($SiO_2$) on a substrate, the first layer having a uniform thickness;
depositing, via graded sputtering, a second layer of amorphous silicon (Si) on the first layer, the second layer having a non-uniform thickness;
depositing, via sputtering, a third layer of silicon dioxide on the second layer, the third layer having a uniform thickness;
depositing, via graded sputtering, a fourth layer of amorphous silicon on the third layer, the fourth layer having a non-uniform thickness;
forming, with electron-beam lithography, a first pattern on the fourth layer to define first areas;
etching, using sulfur hexafluoride ($SF_6$), the fourth layer in the first areas to form first holes;
etching, using trifluoromethane ($CHF_3$), the third layer in the first areas to deepen the first holes to form deepened first holes, the deepened first holes having depths that correspond to the non-uniform thickness of the fourth layer plus the uniform thickness of the third layer;
forming, with electron-beam lithography, a second pattern on the second layer within the deepened first holes to define second areas within respective deepened first holes;
etching, using sulfur hexafluoride, the second layer in the second areas to form second holes; and
etching, using trifluoromethane, the first layer in the second areas to deepen the second holes to form deepened second holes, the deepened second holes having depths that correspond to the non-uniform thickness of the second layer plus the uniform thickness of the first layer.

13. The method of claim 12, further comprising:
forming an imprint of the fourth layer, the third layer, the second layer, and the first layer such that the deepened first holes and the deepened second holes form a plurality of diffractive elements on the imprint, each diffractive element including a lower element extending from a base of the imprint and an upper element extending from the lower element, the lower elements having lower heights that correspond to the non-uniform thickness of the fourth layer plus the uniform thickness of the third layer, the lower elements having lower cross-sectional areas that correspond to the first areas, the upper elements having upper heights that correspond to the non-uniform thickness of the second layer plus the uniform thickness of the first layer, the upper elements having upper cross-sectional areas that correspond to the second areas.

14. The method of claim 13, wherein:

the second layer has a thickness that varies monotonically from a first edge of the imprint to a second edge of the imprint; and the fourth layer has a thickness that varies monotonically from the first edge of the imprint to the second edge of the imprint.

15. A method for generating a diffractive optical element, the method comprising:

depositing a first layer of silicon dioxide ($SiO_2$) on a substrate, the first layer having a uniform thickness;

depositing a second layer of amorphous silicon (Si) on the first layer, the second layer having a non-uniform thickness;

depositing a third layer of silicon dioxide on the second layer, the third layer having a uniform thickness;

depositing a fourth layer of amorphous silicon on the third layer, the fourth layer having a non-uniform thickness;

forming a first pattern on the fourth layer to define first areas;

etching the fourth layer in the first areas to form first holes;

etching the third layer in the first areas to deepen the first holes to form deepened first holes, the deepened first holes having depths that correspond to the non-uniform thickness of the fourth layer plus the uniform thickness of the third layer;

forming a second pattern on the second layer within the deepened first holes to define second areas within respective deepened first holes;

etching the second layer in the second areas to form second holes; and etching the first layer in the second areas to deepen the second holes to form deepened second holes, the deepened second holes having depths that correspond to the non-uniform thickness of the second layer plus the uniform thickness of the first layer.

16. The method of claim 15, wherein the first layer and the third layer are deposited via sputtering.

17. The method of claim 15, wherein the second layer and the fourth layer are deposited via graded sputtering.

18. The method of claim 15, wherein the first pattern and the second pattern are formed with electron-beam lithography.

19. The method of claim 15, wherein the second layer and the fourth layer are etched using sulfur hexafluoride ($SF_6$).

20. The method of claim 15, wherein the first layer and the third layer are etched using trifluoromethane ($CHF_3$).

* * * * *